(12) United States Patent
Takahashi et al.

(10) Patent No.: US 8,031,572 B2
(45) Date of Patent: Oct. 4, 2011

(54) OPTICAL DISC DEVICE AND RECORDING CONDITION SETTING METHOD

(75) Inventors: Toshihiko Takahashi, Osaka (JP); Kazutoshi Aida, Osaka (JP); Masaharu Imura, Osaka (JP)

(73) Assignee: Panasonic Corporation, Osaka (JP)

( * ) Notice: Subject to any disclaimer, the term of this patent is extended or adjusted under 35 U.S.C. 154(b) by 66 days.

(21) Appl. No.: 12/601,393

(22) PCT Filed: May 16, 2008

(86) PCT No.: PCT/JP2008/001224
§ 371 (c)(1),
(2), (4) Date: Nov. 23, 2009

(87) PCT Pub. No.: WO2008/146460
PCT Pub. Date: Dec. 4, 2008

(65) Prior Publication Data
US 2010/0182886 A1    Jul. 22, 2010

(30) Foreign Application Priority Data
May 23, 2007    (JP) .................................. 2007-136956

(51) Int. Cl.
*G11B 7/00* (2006.01)
*G11B 20/10* (2006.01)
(52) U.S. Cl. ................ 369/59.11; 369/53.34; 369/53.36; 369/47.51; 369/59.12
(58) Field of Classification Search ............... 369/59.11, 369/59.12, 47.5–47.53, 116, 53.26, 53.34–53.36, 369/59.2, 59.21
See application file for complete search history.

(56) References Cited

U.S. PATENT DOCUMENTS

| 6,791,926 | B1 * | 9/2004 | Furumiya et al. .......... 369/53.13 |
| 6,975,571 | B1 | 12/2005 | Narumi et al. |
| 2002/0186633 | A1 | 12/2002 | Kai et al. |

(Continued)

FOREIGN PATENT DOCUMENTS

JP    2003-30837    1/2003

(Continued)

OTHER PUBLICATIONS

Supplementary European Search Report issued Aug. 26, 2010 in Application No. EP 08 75 1742.

(Continued)

*Primary Examiner* — Thang Tran
(74) *Attorney, Agent, or Firm* — Wenderoth, Lind & Ponack, L.L.P.

(57) ABSTRACT

The present invention is aimed at providing an optical disc device and a recording condition setting method which can automatically determine an optical recording condition to an optical disc, and the optical disc device comprises an optical pickup which records data on a disc; a data encoder which modulates data to be recorded; a recording timing setting means which sets a timing of recording the data on the disc; a phase error detection means which measures an error amount of a mark recorded on the disc from a position where the mark should be properly located; an error convergence means which calculates error information indicating an optimum position of the mark; a recording timing calculation means which calculates a correction value of the recording timing to be set on the recording timing setting means, based on the error information; and a control means which feedbacks an output of the recording timing calculation means to the recording timing setting means, thereby to optimize the recording timing.

39 Claims, 21 Drawing Sheets

U.S. PATENT DOCUMENTS

| | | | |
|---|---|---|---|
| 2003/0214888 A1* | 11/2003 | Kato et al. | 369/59.11 |
| 2004/0017752 A1 | 1/2004 | Furumiya et al. | |
| 2004/0095862 A1 | 5/2004 | Nakajima et al. | |
| 2005/0099925 A1 | 5/2005 | Nakajo | |
| 2006/0203646 A1* | 9/2006 | Oyama et al. | 369/47.53 |
| 2006/0239166 A1 | 10/2006 | Yu | |
| 2007/0008850 A1 | 1/2007 | Nakajo | |
| 2007/0121462 A1* | 5/2007 | Ishii et al. | 369/59.12 |
| 2007/0183285 A1* | 8/2007 | Nishimura et al. | 369/47.53 |
| 2008/0212425 A1* | 9/2008 | Yukihiro et al. | 369/47.51 |
| 2009/0122673 A1* | 5/2009 | Nakamura et al. | 369/47.53 |
| 2009/0180366 A1 | 7/2009 | Isaji et al. | |

FOREIGN PATENT DOCUMENTS

| | | |
|---|---|---|
| JP | 2007-18582 | 1/2007 |
| WO | 02/084653 | 10/2002 |
| WO | 2007/052797 | 5/2007 |

OTHER PUBLICATIONS

International Search Report issued Aug. 5, 2008 in International (PCT) Application No. PCT/JP2008/001224.

Written Opinion of the ISA issued Aug. 5, 2008 in International (PCT) Application No. PCT/JP2008/001224.

\* cited by examiner

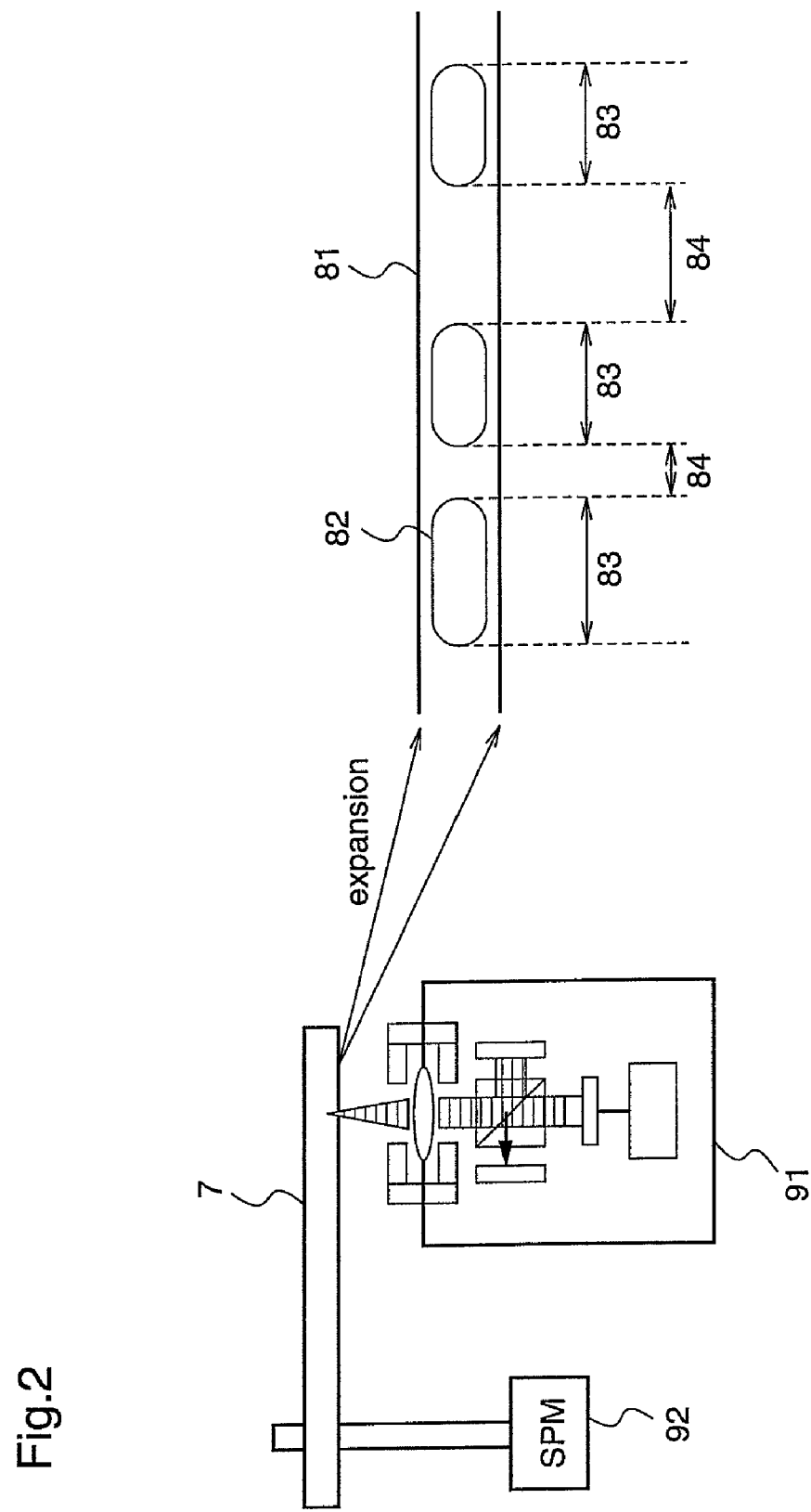

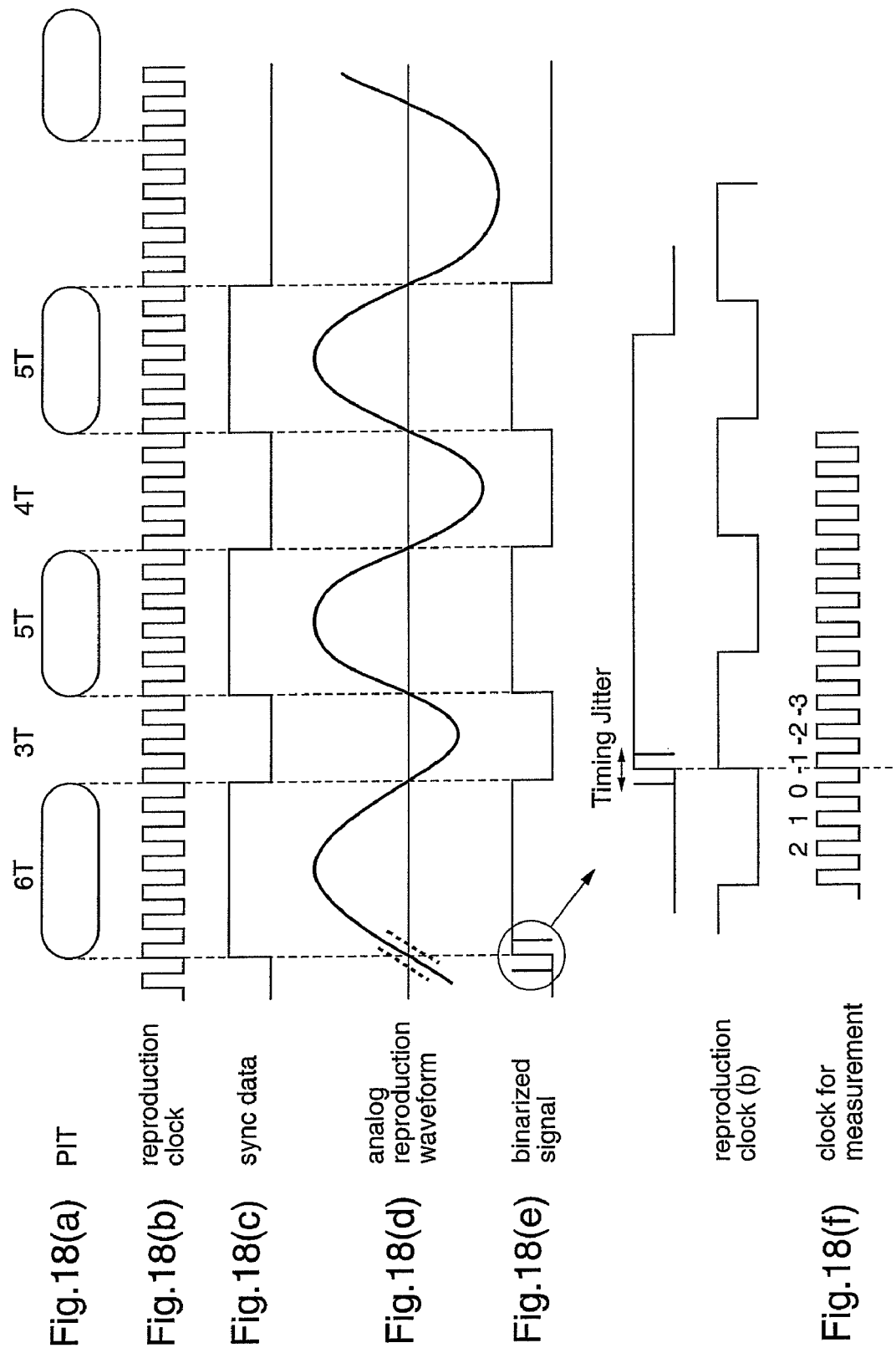

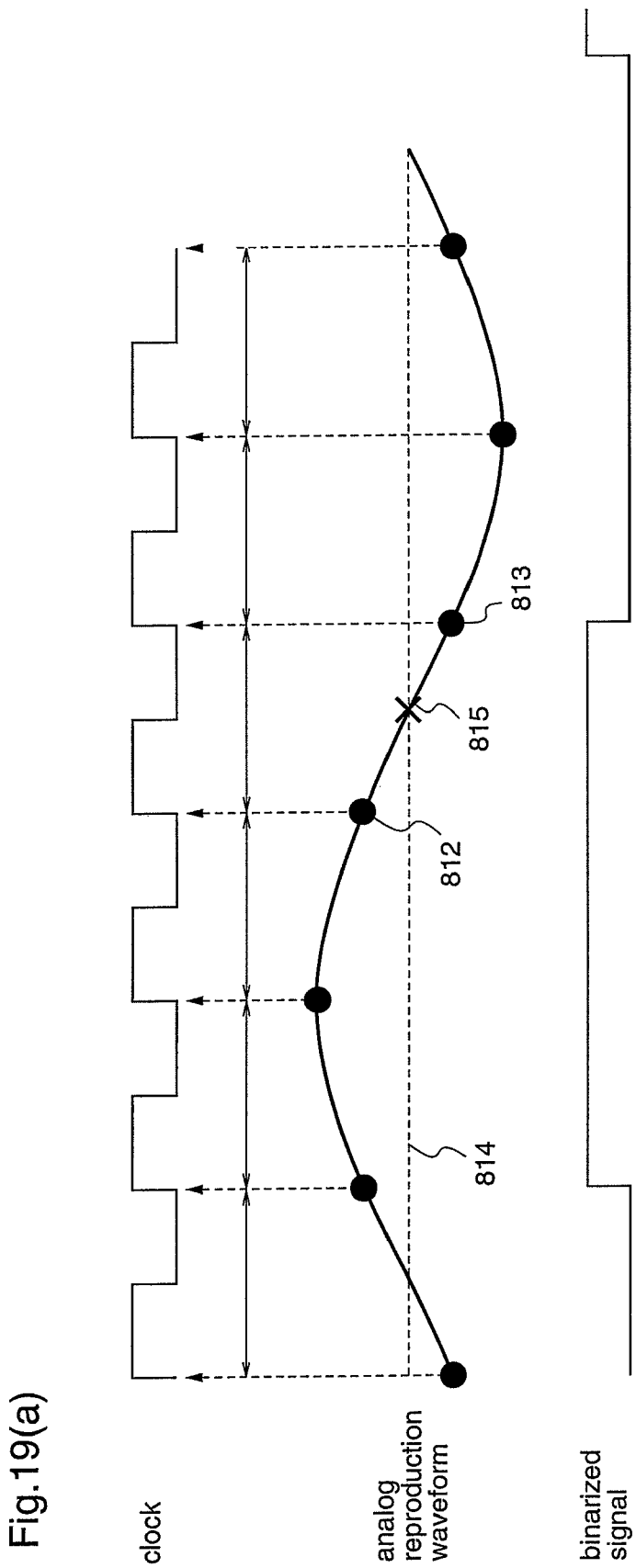

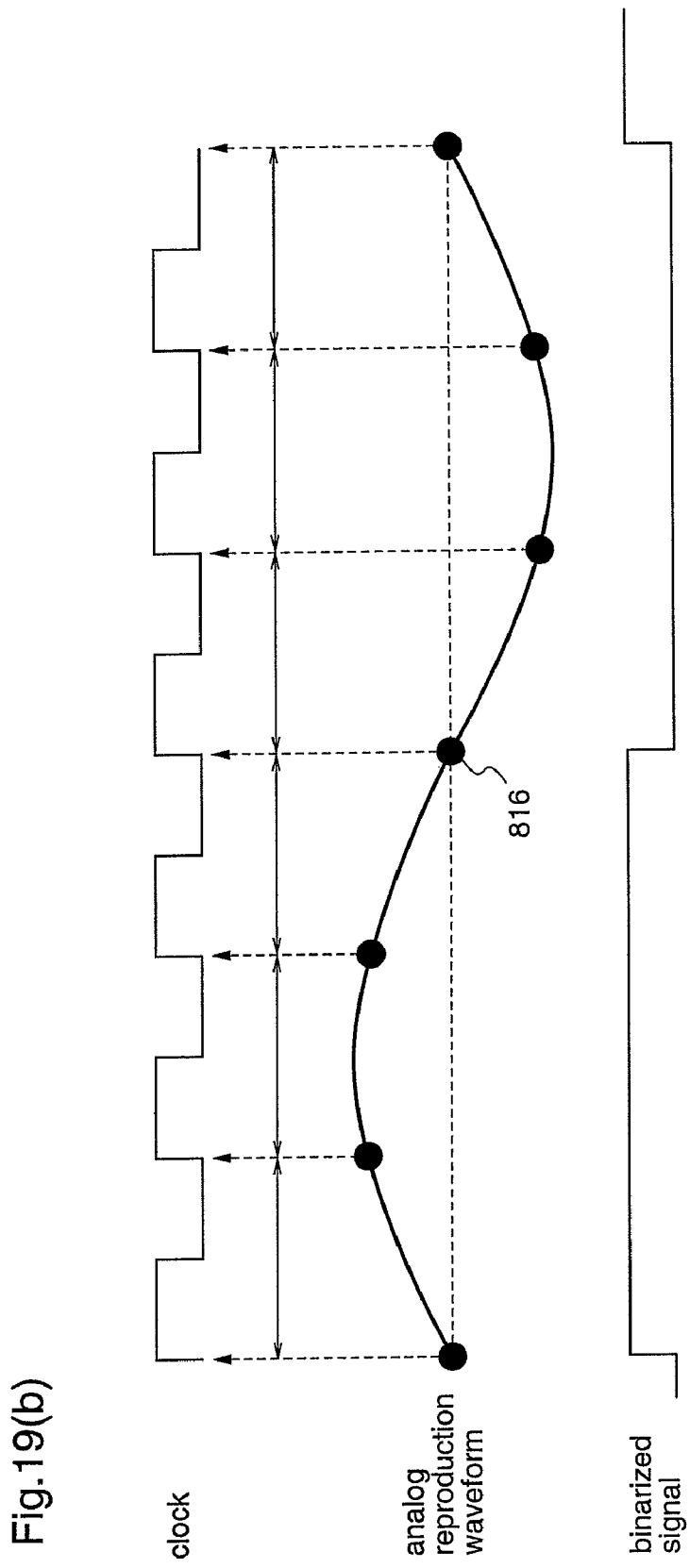

OPTICAL DISC DEVICE AND RECORDING CONDITION SETTING METHOD

TECHNICAL FIELD

The present invention relates to a method for optimizing recording conditions used for information recording/reproduction devices such as optical disc devices. More particularly, the invention relates to an optical disc device for recording data in recordable media requiring compatibility, such as DVD, and a recording condition setting method.

BACKGROUND ART

When recording data in media requiring compatibility such as DVD and CD, it is desired that the recorded data can be reproduced by devices other than a device which has recorded the data. Such media have been produced by many makers, and there exist many inferior media to achieve cost reduction for extreme competition in the market.

Under such circumstances, device makers previously examine the affinity between a recording device and media every time the recording device is developed, and investigate the recording condition for each medium. The result is stored in a memory as a recording condition library in the recording device, and the recording device refers to the recording conditions of media from the library possessed by the recording device, based on the information of a medium inserted by an end user, to perform data recording with the recording condition that is most suitable for the inserted medium.

Patent Document 1: Japanese Published Patent Application No. 2003-30837

DISCLOSURE OF THE INVENTION

Problems to be Solved by the Invention

However, since the conventional recording device requires a lot of work to create the library, development of the recording device takes time. Further, the recording device is required to have many storage areas for the library. Furthermore, the recording device cannot cope with all media, and when a new medium is developed, the recording device cannot record data on the medium with the optimum recording condition, and cannot ensure compatibility with the medium. Furthermore, when the recording media have variations in quality, there may occur a problem that data cannot be recorded in the medium possessed by the end user.

The present invention is made to solve the above-described problems and has for its object to provide an optical disc device and a recording condition setting method which can automatically determine optimum recording conditions for recording media such as CD, DVD, BD, and HD-DVD.

Measures to Solve the Problems

In order to solve the above-described problems, according to Claim 1 of the present invention, there is provided an optical disc device comprising: an optical pickup which records data on a disc, or reproduces data recorded on the disc; a data encoder which modulates data to be recorded to convert the data into a predetermined data format; a recording timing setting means which sets a timing of recording the modulated data on the disc; a phase error detection means which measures error amounts of marks and spaces constituting the data recorded on the disc from positions where the marks and spaces should be properly located; an error convergence means which calculates error information indicating optimum positions of the marks, based on the error amounts detected by the phase error detection means; a recording timing calculation means which calculates a correction value for the recording timing to be set on the recording timing setting means, based on the error information outputted from the error convergence means; and a control means which feedbacks an output of the recording timing calculation means to the recording timing setting means under a predetermined convergence condition, thereby to optimize the data recording condition.

Thereby, the recording condition to the optical disc can be automatically determined, and data can be recorded with stability and high quality even when the media quality varies or a new media has been developed.

Further, according to Claim 2 of the present invention, there is provided an optical disc device comprising: an optical pickup which records data on a disc, or reproduces data recorded on the disc; a recording pattern generation means which generates an arbitrary recording pattern aimed at setting a recording condition; a recording timing setting means which sets a timing of recording a signal outputted from the recording pattern generation means on the disc; a phase error detection means which measures error amounts of marks and spaces constituting the data recorded on the disc from positions where the marks and spaces should be properly located; an error convergence means which calculates error information indicating optimum positions of the marks, based on the error amounts detected by the phase error detection means; a recording timing calculation means which calculates a correction value of a recording timing to be set on the recording timing setting means, based on the error information outputted from the error convergence means; and a control means which feedbacks an output of the recording timing calculation means to the recording timing setting means under a predetermined convergence condition, thereby to optimize the data recording condition.

Thereby, setting of laser power and setting of recording timing can be simultaneously performed.

Further, according to Claim 3 of the present invention, the optical disc device defined in Claim 1 or 2 further includes a laser output control means which controls a laser output at the recording timing that is set by the recording timing setting means so that the recording positions of the marks on the disc are optimized.

Thereby, the phase error can be converged to the target value in a short time, and thus the time required for recording timing setting can be reduced.

Further, according to Claim 4 of the present invention, the optical disc device defined in Claim 1 or 2 further includes a phase error polarity detection means which measures the polarities of temporal deviations of a forward edge of a mark and a backward edge of the mark, respectively, and the error convergence means calculating the error information based on the error amounts with the polarities.

Thereby, the phase error calculating process by the error convergence means is facilitated, and thus the time required for recording timing setting can be reduced.

Further, according to Claim 5 of the present invention, the optical disc device defined in Claim 1 or 2 further includes an amplitude phase error detection means which measures phase information in an amplitude direction of a reproduction signal, the phase information corresponding to temporal deviations of a forward edge of a mark and a backward edge of the mark, and the error convergence means calculating the error information based on the phase information in the amplitude direction of the reproduced signal.

Thereby, even when the phase error cannot be directly measured as timing information, the phase error can be detected based on the phase information in the amplitude direction to optimize the recording timing.

Further, according to Claim 6 of the present invention, the optical disc device defined in Claim 4 or 5 further includes an AD conversion means which converts an analog signal reproduced from the disc into a digital value, and the phase error detection means, the phase error polarity detection means, and the error convergence means performing the processes in digital modes.

Thereby, the phase error calculating process by the error convergence means is facilitated, and thus the time required for recording timing setting can be reduced.

Further, according to Claim 7 of the present invention, in the optical disc device defined in Claim 2, the recording pattern generation means forms and outputs a recording pattern which enables efficient setting of a recording timing.

Thereby, the phase error can be converged to the target value in a short time, and thus the time required for recording timing setting can be reduced.

Further, according to Claim 8 of the present invention, in the optical disc device defined in Claim 1 or 2, the phase error detection means detects a phase error for each combination of marks and spaces of a signal to be recorded on the disc, and the error convergence means calculates the error information for all combinations of marks and spaces which are detected by the phase error detection means.

Thereby, since recording timing setting is performed for all the data patterns, precision of the recording timing setting can be enhanced.

Further, according to Claim 9 of the present invention, in the optical disc device defined in Claim 1 or 2, the phase error detection means detects a phase error for each combination of marks and spaces of a signal to be recorded on the disc, and the error convergence means calculates the error information for a specific combination among all combinations of marks and spaces of the modulated signal to be recorded on the disc.

Thereby, since recording timing setting is performed for a specific data pattern, the processing speed of the recording timing setting can be increased.

Further, according to Claim 10 of the present invention, in the optical disc device defined in Claim 4, the error convergence means sets a parameter which controls a front end of the mark in the recording timing setting means, in a direction along which the mark formation timing should be delayed, when the phase error at the forward edge of the mark is positive, and sets a parameter which controls a rear end of the mark in the recording timing setting means, in a direction along which the mark formation timing should be advanced, when the phase error at the forward edge of the mark is negative.

Thereby, the phase error calculating process by the error convergence means is facilitated, and thus the time required for recording timing setting can be reduced.

Further, according to Claim 11 of the present invention, in the optical disc device defined in Claim 4, the error convergence means sets a parameter which controls a rear end of the mark in the recording timing setting means, in a direction along which the mark formation timing should be delayed, when the phase error at the backward edge of the mark is positive, and sets a parameter which controls a front end of the mark in the recording timing setting means, in a direction along which the mark formation timing should be advanced, when the phase error at the backward edge of the mark is negative.

Thereby, the phase error calculating process by the error convergence means is facilitated, and thus the time required for recording timing setting can be reduced.

Further, according to Claim 12 of the present invention, in the optical disc device defined in Claim 1 or 2, the error convergence means calculates the error information with the recording timing being largely shifted when the error amount detected by the phase error detection means is larger than an arbitrarily set condition, and calculates the error information with the recording timing being slightly shifted when the detected error amount is smaller than the condition, and the control means adjusts the shift change amount of the recording timing by the error convergence means, according to the error amount detected by the phase error detection means.

Thereby, the recording timing can be brought close to the desired recording timing by a single correction, and thus the time required for recording timing setting can be reduced.

Further, according to Claim 13 of the present invention, the optical disc device defined in Claim 1 further includes a code interval detection means which detects mark intervals from a reproduction signal read from the disc, a code interval weighting means which weights the error amounts detected by the phase error detection means, according to the mark intervals detected by the code interval detection means, and the error convergence means calculating the error information based on the weighted error amounts.

Thereby, the phase error amount can be converged to the target value in a short time regardless of the pattern of the recording data.

Further, according to Claim 14 of the present invention, in the optical disc device defined in Claim 1 or 2, when the error amounts obtained for all the combinations of marks and spaces which are detected by the phase error detection means are converged to 0 or within a prescribed range, the control means completes the recording condition setting with the recording condition obtained at that time being an optimum recording condition.

Thereby, the recording timing setting precision can be enhanced.

Further, according to Claim 15 of the present invention, in the optical disc device defined in Claim 1 or 2, when the sum of the error amounts obtained for all the combinations of marks and spaces which are detected by the phase error detection means is converged to 0 or within a prescribed range, the control means completes the recording condition setting with the recording condition at that time being an optimum recording condition.

Thereby, the recording timing setting precision can be enhanced.

Further, according to Claim 16 of the present invention, in the optical disc device defined in Claim 14, when the error amounts obtained for all the combinations of marks and spaces which are detected by the phase error detection means are not converged to 0 or within a prescribed range, the control means completes the recording condition setting with a recording condition which is obtained when the number of corrections for the recording timing by the recording timing setting means has reached a prescribed number of times, as an optimum recording condition.

Thereby, the recording timing setting precision can be enhanced.

Further, according to Claim 17 of the present invention, in the optical disc device defined in Claim 1 or 2, the control means provides a reference for the error amounts of all the combinations of marks and spaces which are detected by the phase error detection means, and when the error amounts of all the combinations of marks and spaces which are detected by the phase error detection means satisfy the reference, the control means completes the recording condition setting with the recording condition at that time being an optimum recording condition.

Thereby, the recording timing setting precision can be enhanced.

Further, according to Claim 18 of the present invention, in the optical disc device defined in Claim 1 or 2, the control means provides a reference for the error amounts of all the combinations of marks and spaces which are detected by the phase error detection means, and does not shift the recording conditions of the combinations of marks and spaces whose error amounts detected by the phase error detection means satisfy the reference, and when the error amounts of all the combinations of marks and spaces are converged to the reference value or below and the sum of the phase errors at that time becomes equal to or lower than an arbitrary reference value, the control means completes the recording condition setting with recording condition at that time as an optimum recording condition.

Thereby, the recording timing setting precision can be enhanced.

Further, according to Claim 19 of the present invention, in the optical disc device defined in Claim 1 or 2, the control means provides arbitrary reference values A, B and larger reference values which satisfy the relation "A<B<...<n" for the error amounts of all the combinations of marks and spaces which are detected by the phase error detection means; when the error amount obtained for a certain combination of marks and spaces satisfies the reference that is set for the combination, the control means regards the recording condition at that time as an optimum recording condition for the combination; when the error amount obtained for a certain combination of marks and spaces exceeds the reference that is set for the combination, the control means regards, as an optimum recording condition for the combination, the recording condition at the time when the obtained error amount satisfies a reference that is next largest to the reference and the sum of the error amounts of all the combinations is converged to a predetermined value or below; and the control means does not shift the recording condition of the combination for which the optimum recording condition has been obtained, and completes the recording condition setting when the optimum recording conditions for all the combinations of marks and spaces have finally been obtained.

Thereby, the recording timing setting precision can be enhanced.

Further, according to Claim 20 of the present invention, there is provided a recording condition setting method comprising: a recording data output step of outputting data to be recorded on an optical disc; a recording timing setting step of setting a timing of recording the outputted recording data on the disc; a data recording step of recording the recording data on the disc; a phase error detection step of measuring error amounts of marks and spaces constituting the data recorded on the disc from the positions where the marks and spaces should be properly located; an error convergence step of calculating error information indicating optimum positions of the marks, based on the error amounts detected by the phase error detection means; a recording timing calculation step of calculating a correction value of the recording timing that is set in the recording timing setting step, based on the error information outputted from the error convergence means; and a control step of judging whether the recording timing is optimum or not based on the error amounts detected in the phase error detection step, and when the recording timing is not optimum, performing recording on the disc with the correction value calculated in the recording timing calculation step being reflected onto the recording timing that is set in the recording timing setting step, thereby to finally detect an optimum recording condition.

Thereby, the recording condition to the optical disc can be automatically determined, and data can be recorded with stability and high quality even when the media quality varies or a new media has been developed.

Further, according to Claim 21 of the present invention, in the recording condition setting method defined in Claim 20, the data generated in the recording data output step has an arbitrary recording pattern aimed at setting a recording condition, and enables efficient setting of a recording timing.

Thereby, the phase error can be converged to the target value in a short time, and thus the time required for recording timing setting can be reduced.

Further, according to Claim 22 of the present invention, in the recording condition setting method defined in Claim 20, the error convergence step calculates the error information with the recording timing being largely shifted when the error amounts detected in the phase error detection step are larger than an arbitrarily set condition, and calculates the error information with the recording timing being slightly shifted when the error amounts are smaller than the condition, and the control step adjusts the shift change amount of the recording timing in the error convergence step, according to the error amounts detected in the phase error detection step.

Thereby, the recording timing can be brought close to the desired recording timing by a single correction, and thus the time required for recording timing setting can be reduced.

Further, according to Claim 23 of the present invention, the recording condition setting method defined in Claim 20 further includes a code interval detection step of detecting mark intervals from a reproduction signal read from the disc, a code interval weighting step of weighting the error amounts detected in the phase error detection step, according to the mark intervals detected in the code interval detection means, and the error convergence step calculating the error information based on the weighted error amounts.

Thereby, the phase error amount can be converged to the target value in a short time regardless of the pattern of the recording data.

Effects of the Invention

According to the optical disc device of the present invention, an error between the physical position where a recording mark should be properly located and the actually recorded mark is detected, and information representing this deviation in mark formation is fed back to the recording timing setting means, thereby to set an optimum recording condition. Therefore, data can be recorded with the optimum recording condition according to the recording medium loaded on the optical disc device, and the data can be recorded with stability and high quality even when the media quality varies or a new media has been developed.

BRIEF DESCRIPTION OF THE DRAWINGS

FIG. 2 is an enlarged view of a recording plane of an optical disc.

FIG. 3($b$) is a schematic diagram illustrating a state where a recording timing error occurs on the optical disc.

FIGS. 18(a)-18(f) illustrate a timing chart for explaining the operation of the optical disc device according to the fourth embodiment.

FIG. 19(a) is a timing chart for explaining the operation of the optical disc device according to the fifth embodiment.

FIG. 19(b) is a timing chart for explaining the operation of the optical disc device according to the fifth embodiment.

DESCRIPTION OF REFERENCE NUMERALS

Figure 1:
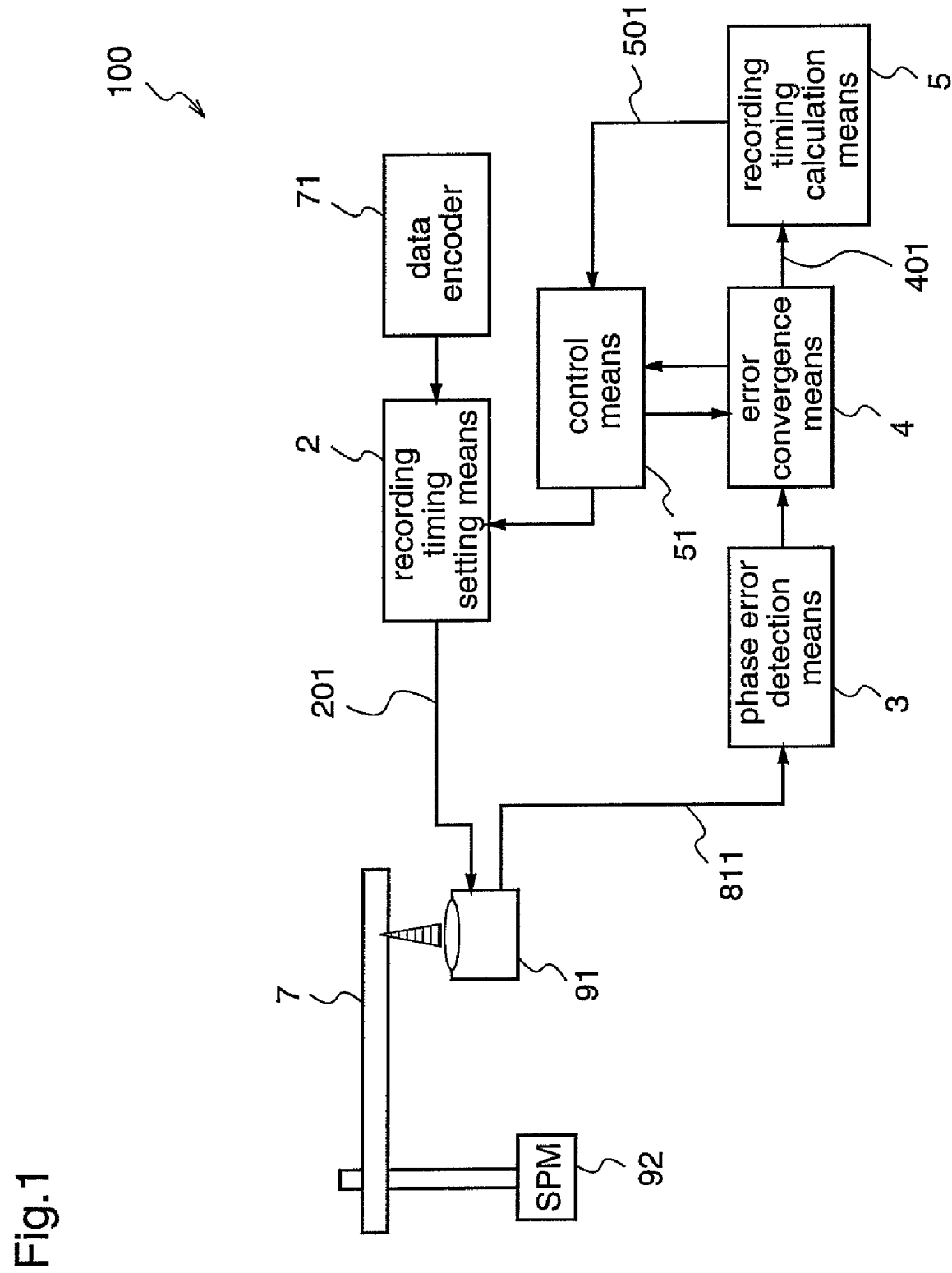
FIG. 1 is a block diagram illustrating an optical disc device according to a first embodiment of the present invention.

2 . . . recording timing setting means
3 . . . phase error detection means
4 . . . error convergence means
5 . . . recording timing calculation means
6 . . . phase error polarity detection means
7 . . . DISC
51 . . . control means
62 . . . amplitude phase error detection means
63 . . . A/D converter
64 . . . code interval detection means
65 . . . weighting means
71 . . . data decoder
72 . . . LPC
73 . . . recording pattern generation means
81 . . . track
82 . . . PIT
83 . . . mark
84 . . . space
85 . . . phase error: positive
85B . . . phase error: negative
86 . . . phase error: negative
86B . . . phase error: positive
91 . . . OPU
92 . . . SPM
201 . . . recording timing signal
401 error signal
501 recording timing correction signal
811 reproduction signal
821 leading edge
822 trailing edge

BEST MODE TO EXECUTE THE INVENTION

Embodiment 1

FIG. 1 is a block diagram illustrating an optical disc device 100 according to a first embodiment of the present invention.

In FIG. 1, reference numeral 2 denotes a recording timing setting means which generates a recording timing signal 201 indicating a recording timing of data to be recorded in a DISC 7. Reference numeral 3 denotes a phase error detection means which detects a deviation (phase error) from timing information (position information modified) originally possessed by data reproduced from the DISC 7, using a reproduction signal 811 and a channel clock extracted from the reproduction signal 811. The phase error detection means 3 detects combinations of marks and spaces (data pattern) included in the reproduction signal 811, and detects a phase error for each data pattern.

Reference numeral 4 denotes an error convergence means which generates error information 401 for finally converging the phase errors detected by the phase error detection means 3 into optimum values, with the deviation from the position where the data should properly be located on the DISC being reflected to the recording timing. The error convergence means 4 performs large/small judgment for the phase errors detected by the phase error detection means 3, addition of the phase errors, and level classification for the phase errors subjected to the large/small judgment, and generates error information 401 corresponding to a control amount for converging the errors based on the phase errors.

Figure 20:
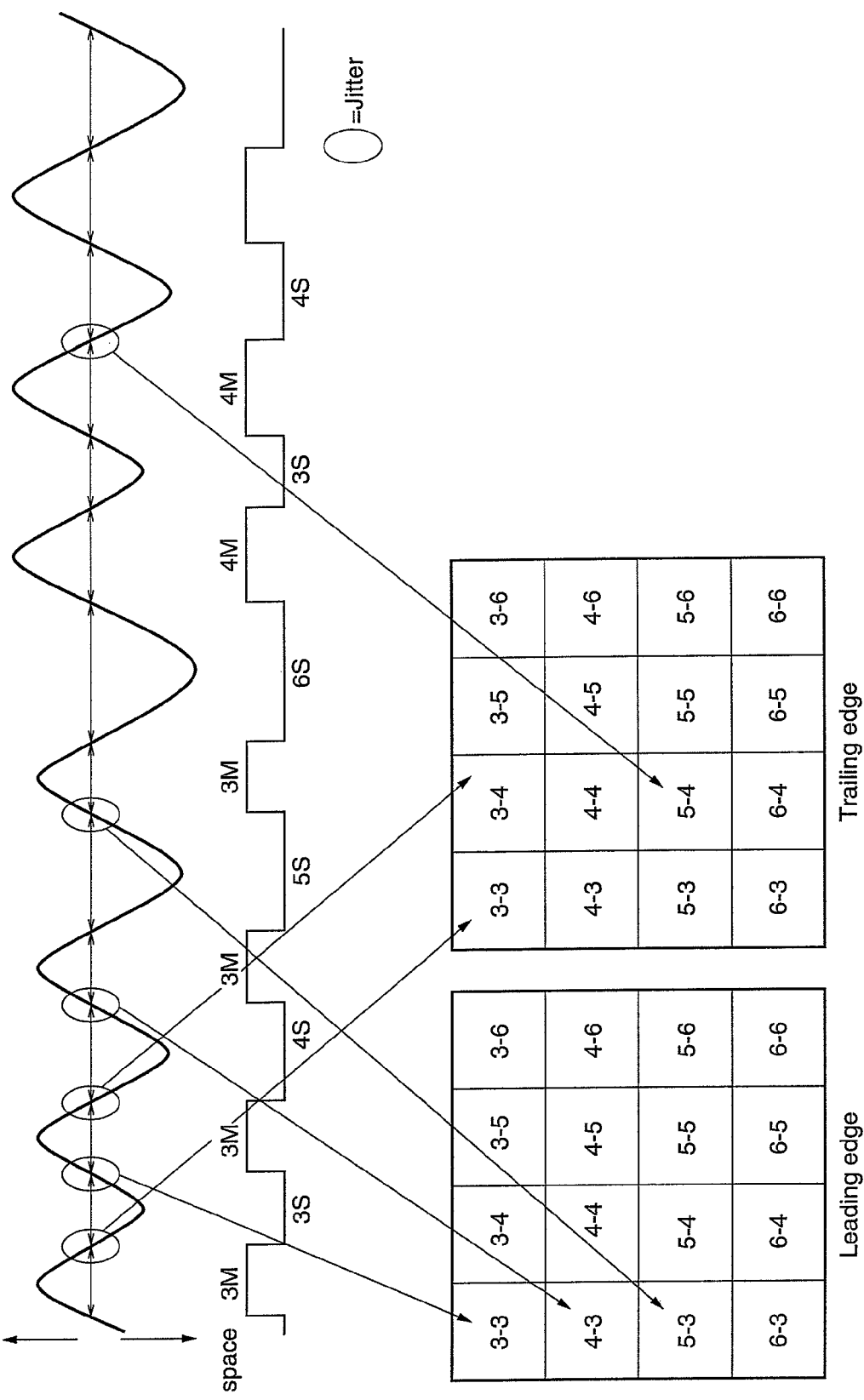
FIG. 20 is a diagram for explaining error information of the present invention.

The error information 401 shows the deviations of the reproduced signal from the PIT positions which should be obtained from the proper signal (or ideal signal). For example, as shown in FIG. 20, the recording timing shift amount is varied based on a predetermined table or conversion formula, for the phase error information obtained in the phase error matrix in which phase errors are obtained for every combination (data pattern) of marks and spaces. Setting of this table or conversion formula is controlled by the control means 51 so as to optimize the control amount.

The error convergence means 4 may generate the error information 401 based on a single measurement result which is stored in the phase error matrix shown in FIG. 20, or it may generate the error information 401 based on an integrated value obtained by integrating the values successively stored in the phase error matrix. Further, the error information 401 may be formed for all the data patterns obtained in the phase error matrix, or it may be formed for each combination of lengths of specific mark and space, or it may be formed regardless of combinations of lengths of marks and spaces. These settings are controlled by the control means 51.

Reference numeral 5 denotes a recording timing calculation means for converting the output of the error convergence means 4 into a recording timing. The recording timing calculation means 5 calculates correction parameter values (correction amount, correction direction) to be set on the recording timing setting means, based on the error information 401 outputted from the error convergence means 4, and outputs the parameter values as a recording timing correction signal 501 to the control means 51. The function for converting the error information 401 into the correction parameter values is set by the control means 51 so that the correction amount or the correction direction is optimized.

The control means 51 controls searching for an optimum recording condition in the optical disc device, changing of the recording timing shift amount by the error convergence means 4, calculation of the correction parameter values by the recording timing calculation means 5, and setting of the recording timing correction signal 501 on the recording timing setting means 3.

Further, in FIG. 1, reference numeral 7 denotes a recording medium (DISC) on which data are recorded, 71 denotes a data encoder which converts data from a HOST such as a PC into recording data, 91 denotes an optical pickup (OPU) which records and reproduces data in and from the DISC 7, and 92 denotes a spindle motor (SPM) which rotates the DISC 7.

Figure 3A:
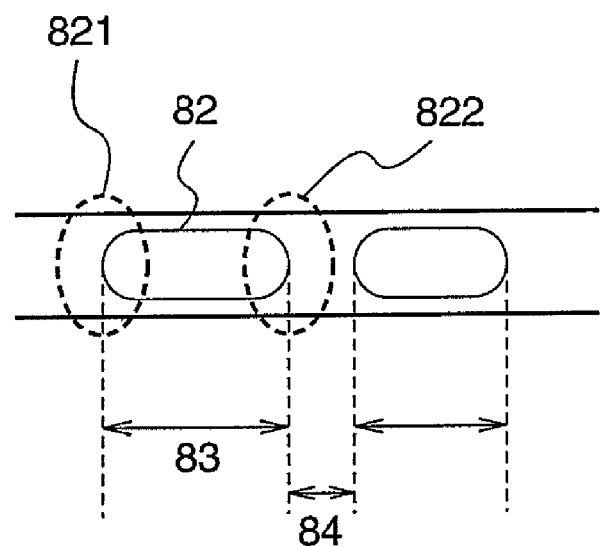
FIG. 3($a$) is a schematic diagram illustrating a state where a recording timing error occurs on the optical disc.
Figure 3B:
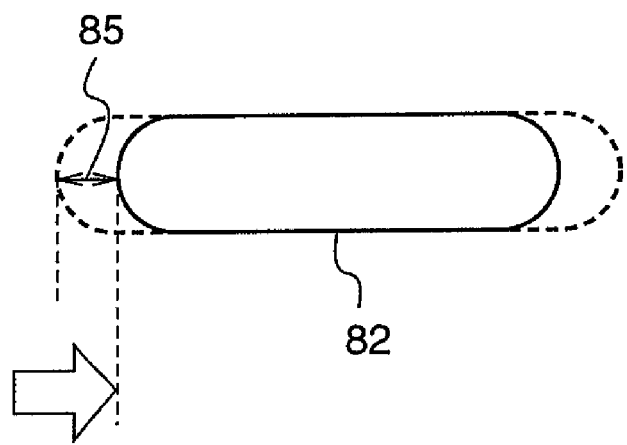

FIGS. 2 and 3 are diagrams for explaining the operation of the optical disc device of the first embodiment, illustrating the states of the recorded data on the DISC 7.

FIG. 2 is an enlarged view of a recording plane of the DISC 7, wherein reference numeral 81 denotes a track which serves as a guide for making the data sequence successively follow, which has previously been formed on the DISC 7. Reference numeral 82 denotes PITs constituting the data recorded on the track 81, reference numeral 83 denotes marks showing the longitudinal direction of the PITs 82, and reference numeral 84 denotes spaces showing intervals sandwiched by the marks 83.

FIG. 3 is a schematic diagram illustrating the state where a recording timing deviation occurs on the DISC 7. In FIG. 3(*a*), reference numeral 821 denotes a leading edge as a front edge of the PIT 82, and reference numeral 822 denotes a trailing edge as a rear edge of the PIT 82. FIG. 3(*b*) shows the state where a recording timing deviation shown by a dashed line occurs with respect to the normal recording position shown by a solid line, wherein reference numeral 85 denotes a phase error having a positive sign.

Next, the operation of the optical disc device 100 configured as described above will be described.

When data to be recorded is transferred from the data encoder 71 to the recording timing setting means 2, a recording timing signal 201 is generated by the recording timing setting means 2. Since recorded data to be corrected does not exist on the DISC 7 at the first-time recording, a recording timing correction signal 501 is not outputted or it is a meaningless signal, and the recording timing setting means 2 generates a recording timing signal 201 without using this information under the control of the control means 51.

When the recording timing signal 201 is outputted to the OPU 91, a laser pulse is emitted from the OPU 91 to the DISC 7 based on the recording timing signal 201, and data is recorded on the DISC 7. The data recorded in the DISC 7 is reproduced by the OPU 91, and a reproduction signal 811 is transferred to the phase error detection means 3.

A phase error between the normal PIT position and the reproduction signal 811 is detected by the phase error detection means 3, and the detected phase error is outputted to the error convergence means 4. In the error convergence means 4, error information 401 is generated so that the PIT position is converged to its normal position, under the control of control means 51.

The error information 401 generated by the error convergence means 4 is outputted to the recording timing calculation means 5. In the recording timing calculation means 5, a timing correction amount required for correcting the phase error is calculated to be output as a recording timing correction signal 501.

Then, it is judged by the control means 51 as to whether the recording timing setting condition complies with the termination condition or not, based on the recording timing correction amount or the number of corrections for the recording timing. When the termination condition is satisfied, the recording timing at that time is stored as an optimum value.

On the other hand, when the termination condition is not satisfied, the recording timing correction signal 501 is set on the recording timing setting means 2, and a recording timing signal 201 including a deviation from the reference position of the data to be recorded is generated by the recording timing setting means 2 with reference to a channel clock synchronized with the reproduction signal. Then, the above-described operation is repeatedly carried out until the recording timing satisfies the desired requirement under the control of the control means 51, and thus an optimum recording condition is derived.

As described above, according to the optical disc device of the first embodiment, an error between the physical position (size) where a recording mark should be properly located and the actually recorded mark is detected, and information representing this deviation in mark formation is fed back to the recording timing setting means, thereby to set an optimum recording condition. Therefore, data can be recorded with the optimum recording condition according to the recording medium loaded on the optical disc device, and thus the data can be recorded with stability and high quality even when the media quality varies or a new medium is developed.

Embodiment 2

Figure 4:
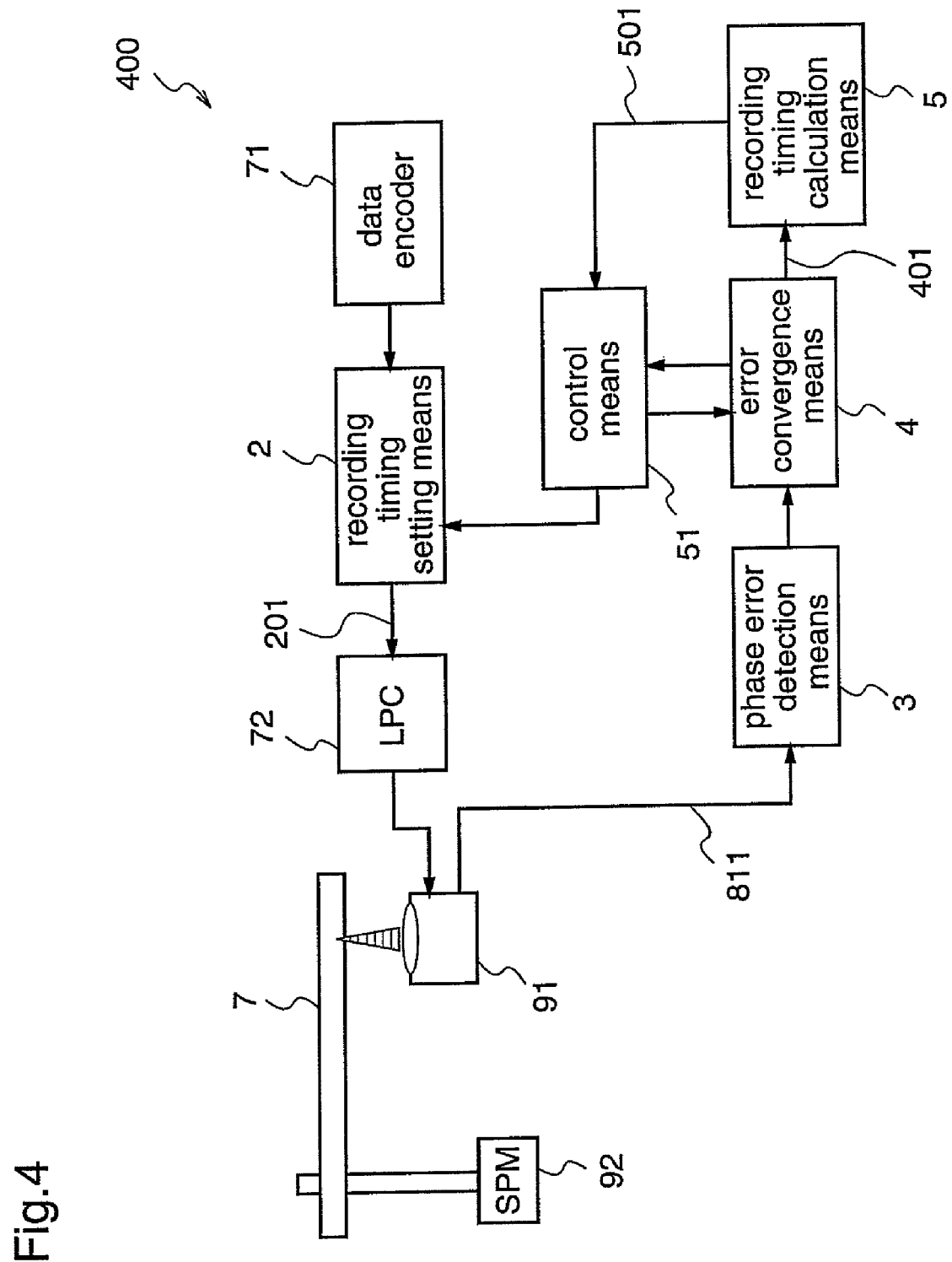
FIG. 4 is a block diagram illustrating an optical disc device according to a second embodiment of the present invention.

FIG. 4 is a block diagram of an optical disc device 400 according to a second embodiment of the present invention. In FIG. 4, the same constituents as those in the optical disc device of the first embodiment are give the same reference numerals to omit description thereof.

In FIG. 4, reference numeral 72 denotes a laser power controller (LPC) which controls the laser power during reproduction or recording. The LPC 72 records data with varying the laser power at recording within a prescribed range above and below the current laser power, refers to the error information 401 obtained then or the error rate of data, and judges the laser power at which the error information 401 or the error rate takes the best or approximately best value as an optimum laser power to perform optimization of the laser power.

Next, the operation will be described.

When recording data is transferred from the data encoder 71 to the recording timing setting means 2, a recording timing signal 201 is generated by the recording timing setting means 2 under a prescribed recording condition. Since recorded data to be corrected does not exist in the DISC 7 at the first-time recording, the value of the recording timing correction signal 501 is not reflected to the recording timing signal 201 as described in the first embodiment.

The recording timing signal 201 is outputted to the LPC 72, and the laser power is optimized by the LPC 72, and then a laser driving signal is outputted from the LPC 72. Based on the output from the LPC 72, the OPU 91 emits a laser pulse to the DISC 7, and thereby data is recorded on the DISC 7.

The data recorded on the DISC 7 is reproduced by the OPU 91, and a reproduction signal 811 is transferred to the phase error detection means 3. In the phase error detection means 3, a phase error between the normal PIT position and the reproduction signal 811 is detected.

In the phase error detection means 3, a phase error between the normal PIT position and the reproduction signal 811 is detected, and the detected phase error is outputted to the error convergence means 4. In the error convergence means 4, error information 401 is generated so that the PIT position is converged to the normal position, under the control of the control means 51.

The error information 401 generated by the error convergence means 4 is outputted to the recording timing calculation means 5. In the recording timing calculation means 5, a recording timing correction signal 501 is calculated based on the error information 401 to be output to the control means 51.

Thereafter, as described in the first embodiment, it is judged by the control means 51 as to whether the recording timing setting condition complies with the termination condition or not under the prescribed convergence condition. When the termination condition is not satisfied, the recording timing correction signal 501 is set in the recording timing setting means 2, and a recording timing signal 201 including a deviation from the reference position of the data to be recorded is generated by the recording timing setting means 2. Then, the above-described operation is repeatedly executed until the recording timing satisfies the desired requirements under the control of the control means 51, and thus an optimum recording condition is derived.

As described above, according to the optical disc device of the second embodiment, an error between the physical position (size) where a recording mark should be properly located and the actually recorded mark is detected, and information representing this deviation in mark formation is fed back to the recording timing setting means to set an optimum recording condition, and thus data can be recorded with stable high quality.

At this time, in the optical disc device of the second embodiment, since the laser power at recording the data is adjusted to the optimum value according to a deviation from the normal position of the recording data each time the recording timing is corrected, setting of the laser power and setting of the recording timing can be simultaneously performed, and thus setting of the recording timing can be performed with high precision.

Embodiment 3

Figure 5:
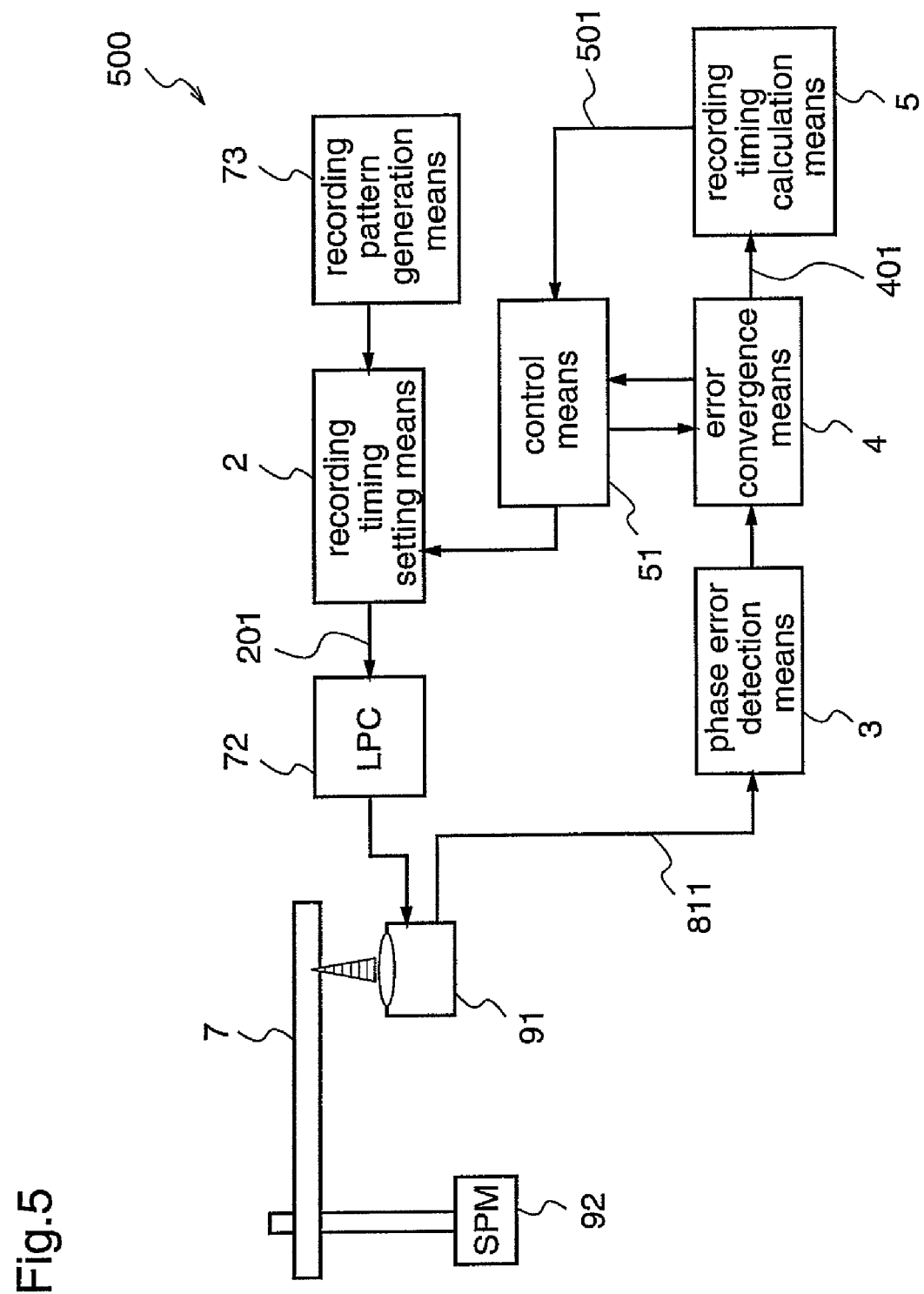
FIG. 5 is a block diagram illustrating an optical disc device according to a third embodiment of the present invention.

FIG. 5 is a block diagram of an optical disc device 500 according to a third embodiment of the present invention. In FIG. 5, the same constituents as those of the optical disc devices according to the first and second embodiments are given the same reference numerals to omit description thereof.

In FIG. 5, reference numeral 73 denotes a recording pattern generation means which generates data patterns for recording arbitrary pattern data on the DISC 7. Specific patterns of recording data generated by the recording pattern generation means 73 are those arbitrarily generated to efficiently confirm the quality of the recording data, and include, for example, a data pattern which can obtain the result in a shortest time to obtain an optimum value of a recording condition, and a data pattern which can minimize the area required for recording. Various combinations can be considered as the data patterns. For example, there are assumed a pattern in which all the combinations of data patterns based on the data modulation rules appear each for one time, and a pattern in which all the combinations of lengths of marks and spaces appear each for one time or the same number of times.

While in this third embodiment the LPC 72 is provided as in the second embodiment, the recording timing signal 201 may be directly input to the optical pickup (OPU) 92 as in the first embodiment.

Next, the operation will be described.

When recording data of a specific pattern is transferred from the recording pattern generation means 73 to the recording timing setting means 2, a recording timing signal 201 is generated by the recording timing setting means 2 under the prescribed recording condition. Since recorded data to be corrected does not exist on the DISC 7 at the first-time recording, the value of the recording timing correction signal 501 is not reflected to the recording timing signal 201 as described in the first embodiment.

After optimization of the laser power with respect to the recording timing signal 201 is performed by the LPC 72, a laser pulse is emitted from the OPU 91 to the DISC 7, and thereby data is recorded on the DISC 7. The data recorded on the DISC 7 is reproduced by the OPU 91, and a reproduction signal 811 is outputted to the phase error detection means 3.

In the phase error detection means 3, a phase error between the normal PIT position and the reproduction signal 811 is detected, and the detected phase error is outputted to the error convergence means 4. In the error convergence means 4, error information 401 is generated so that the PIT position is converged to the normal position, under the control of the control means 51.

The error information 401 generated by the error convergence means 4 is outputted to the recording timing calculation means 5. In the recording timing calculation means 5, a recording timing correction signal 501 is calculated based on the error information 401 to be outputted to the control means 51.

Thereafter, as described in the first embodiment, it is judged by the control means 51 as to whether the recording timing setting condition complies with the termination condition or not under the prescribed convergence condition. When the termination condition is not satisfied, the recording timing correction signal 501 is set on the recording timing setting means 2, and a recording timing signal 201 including a deviation from the reference position of the data to be recorded is generated by the recording timing setting means 2. Then, the above-described operation is repeatedly performed until the recording timing satisfies the desired requirements under the control of the control means 51, and thus an optimum recording condition is derived.

As described above, according to the optical disc device of the third embodiment, an error between the physical position (size) where a recording mark should be properly located and the actually recorded mark is detected, and information representing this deviation in mark formation is fed back to the recording timing setting means to set an optimum recording condition, and thus data can be recorded with stable high quality.

At this time, in the optical disc device of the third embodiment, since data of an efficient specific pattern which enables the phase error detection means to accurately detect a phase error from the data recorded on the medium in a short time is recorded as recording data, the time required for recording timing setting can be reduced.

Embodiment 4

Figure 6:
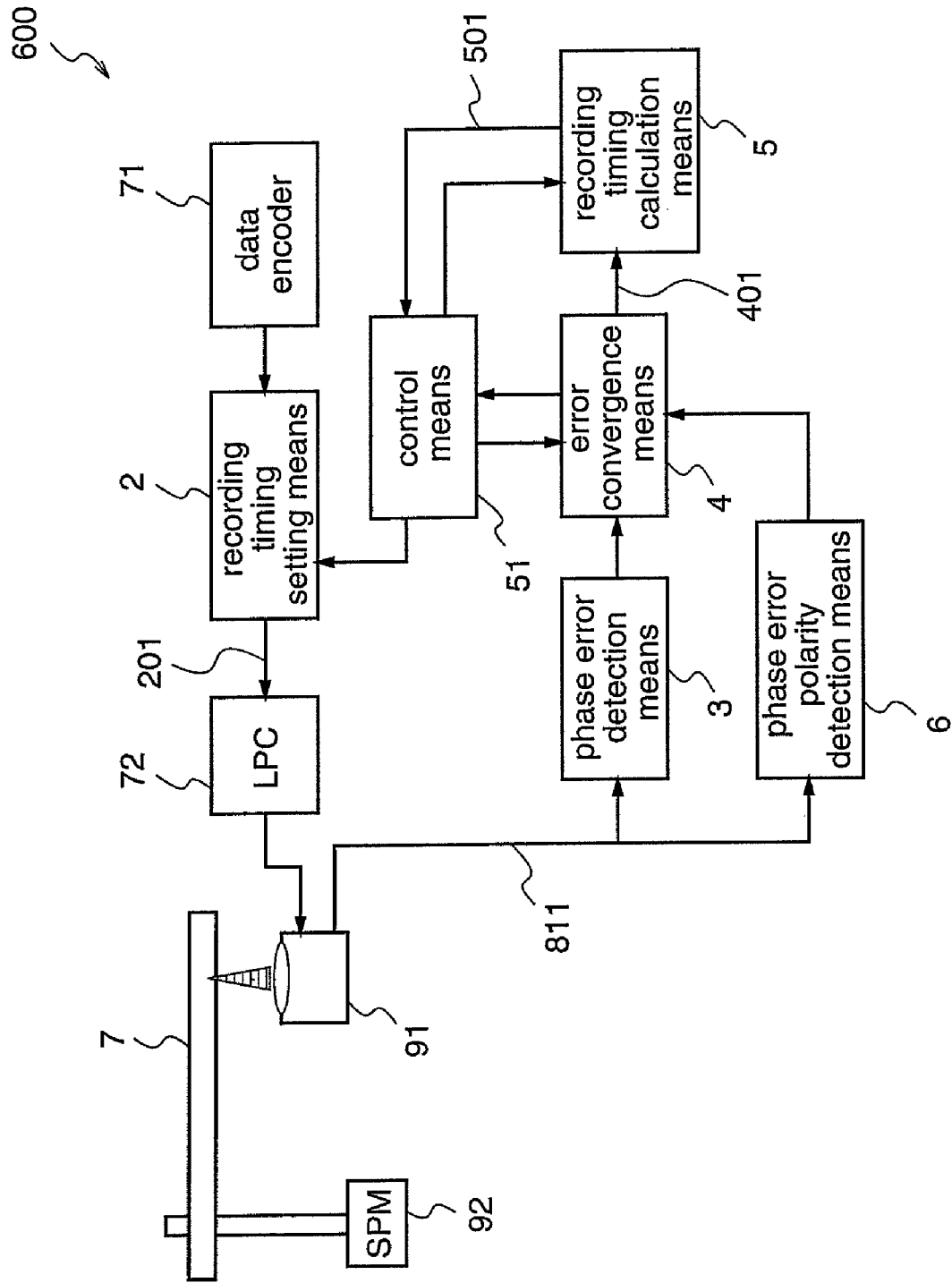
FIG. 6 is a block diagram illustrating an optical disc device according to a fourth embodiment of the present invention.

FIG. 6 is a block diagram of an optical disc device 600 according to a fourth embodiment of the present invention. In FIG. 6, the same constituents as those of the optical disc devices according to the first to third embodiments are given the same reference numerals to omit description thereof.

In FIG. 6, reference numeral 6 denotes a phase error polarity detection means which judges the positive/negative polarities of deviations of a leading edge and a trailing edge from the reference positions thereof. Further, the error convergence means 4 in this fourth embodiment processes the phase error outputted from the phase error detection means 3, with its polarity.

Figure 7:
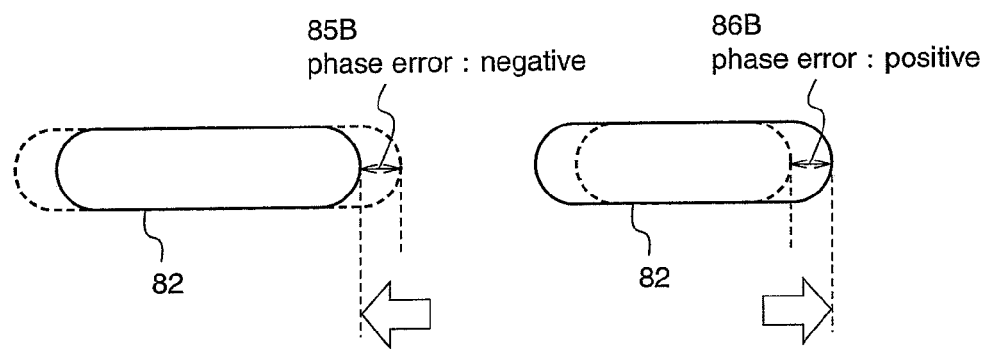
FIG. 7 is a diagram for explaining a phase error according to the fourth embodiment.

FIG. 7 is a diagram for explaining a phase error in this fourth embodiment, illustrating a phase error of a trailing edge.

In FIG. 7, reference numeral 85B shows a phase error having a negative sign, which is caused by occurrence of a recording timing deviation shown by a dashed line with respect to the normal recording position shown by a solid line. Further, reference numeral 86B denotes a phase error having a positive sign, which is caused by occurrence of a recording timing deviation shown by a dashed line with respect to the normal recording position shown by the solid line.

While in this fourth embodiment LPC 72 is provided as in the second embodiment, the recording timing signal 201 may be directly input to the optical pickup (OPU) 92 as in the first embodiment. Further, the optical disc device of this fourth embodiment may be provided with the recording pattern generation means 73 described in the third embodiment, instead of the data encoder 71.

Next, the operation of the optical disc device configured as described above will be described with reference to FIGS. 6 and 18.

FIG. 18 is a diagram for explaining the operation of the optical disc device 600 of the fourth embodiment. In FIG. 18, (a) shows a recording pit sequence, (b) shows a reproduction clock extracted from the reproduction signal, (c) shows sync data, (d) shows an analog reproduction waveform, (e) shows a binarized signal of the analog reproduction waveform, and (f) shows a clock for phase error measurement which is generated based on the reproduction clock (b).

When recording data is transferred from the data encoder 71 to the recording timing setting means 2, the recording timing setting means 2 generates a recording timing signal 201 under the prescribed recording condition. Since recorded data to be corrected does not exist on the DISC 7 at the first-time recording, the value of the recording timing correction signal 501 is not reflected to the recording timing signal 201 as described in the first embodiment.

After optimization of the laser power with respect to the recording timing signal 201 is performed by the LPC 72, a laser pulse is emitted from the OPU 91 to the DISC 7, and data is recorded on the DISC 7. The data recorded on the DISC 7 is reproduced by the OPU 91, and thereby a reproduction signal 811 is outputted to the phase error detection means 3.

In the phase error detection means 3, a phase error between the normal PIT position and the reproduction signal 811 is detected. As shown in FIG. 18(e), when a phase error occurs at a leading edge of a pit, a phase error (Timing Jitter) is detected using the measurement clock (f) with an edge of the reproduction clock (b) being a reference position. Further, in the phase error polarity detection means 6, the polarities of deviations from the reference position of the PIT 82 at the leading edge and the trailing edge are judged, respectively, and the results are outputted to the error convergence means 4.

In the error convergence means 4, error information 401 is generated based on the phase errors with the positive and negative polarities under the control of the control means 51, and outputted to the recording timing calculation means 5. In the recording timing calculation means 5, a recording timing correction signal 501 is generated based on the error information 401, and outputted to the control means 51.

Thereafter, as described in the first embodiment, it is judged by the control means 51 as to whether the recording timing setting condition complies with the terminal condition or not under the prescribed convergence condition. When the termination condition is not satisfied, the recording timing correction signal 501 is set in the recording timing setting means 2, and a recording timing signal 201 including a deviation from the reference position of the data to be recorded is generated by the recording timing setting means 2. Then, the above-described operation is repeated until the recording timing satisfies the desired requirements under the control of the control means 51, and thus an optimum recording condition is derived.

As described above, according to the optical disc device of the fourth embodiment, an error between the physical position (size) where a recording mark should be properly located and the actually recorded mark is detected, and information representing this deviation in mark formation is fed back to the recording timing setting means to set an optimum recording condition, and thus data can be recorded with stable high quality.

At this time, in the optical disc device of the fourth embodiment, since the phase error is processed with its polarity, the phase error calculation process by the error convergence means is facilitated, and thereby the time required for recording timing setting can be shortened, and the circuit scale can be reduced.

Embodiment 5

Figure 8:
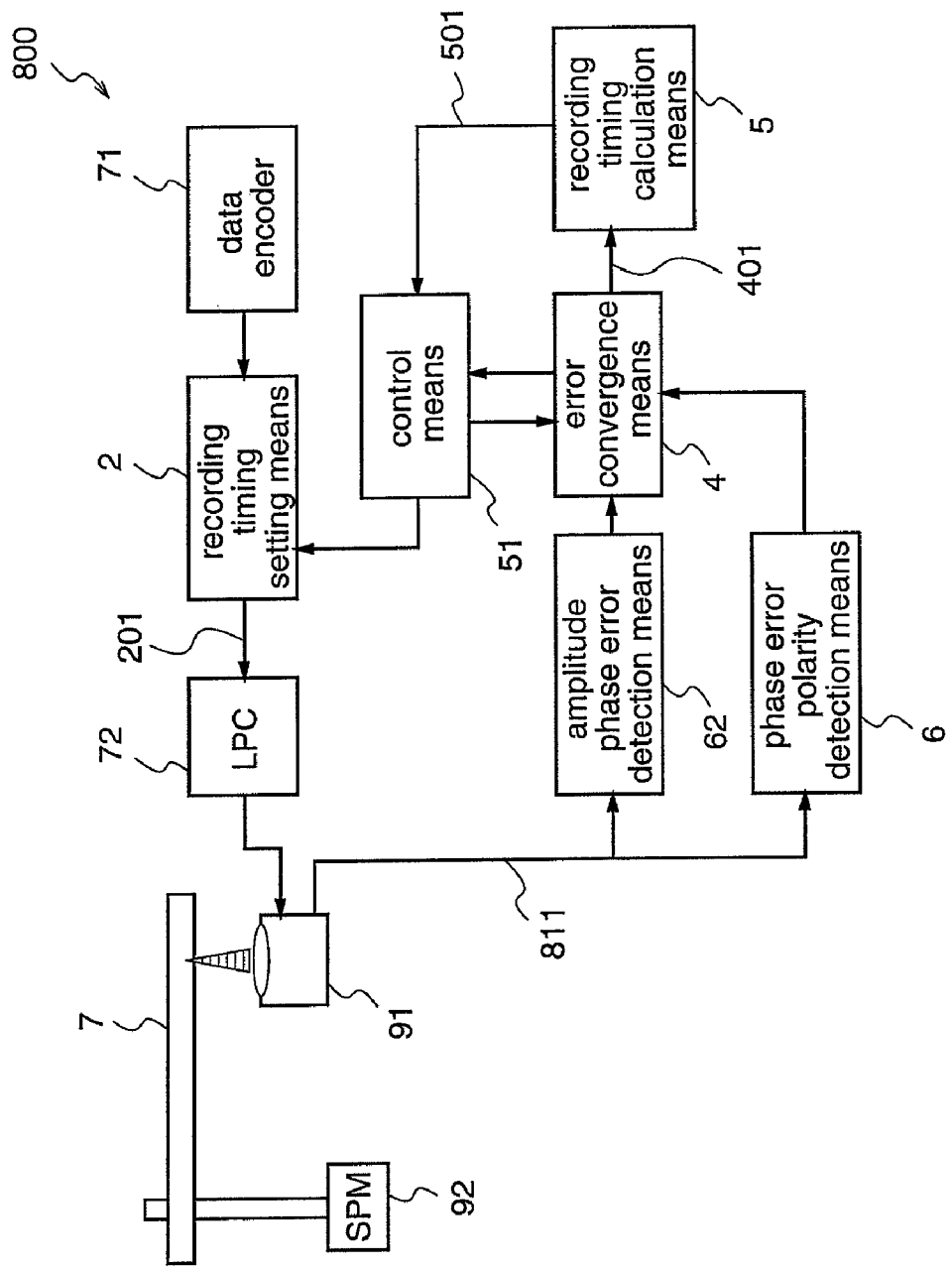
FIG. 8 is a block diagram illustrating an optical disc device according to a fifth embodiment of the present invention.

FIG. 8 is a block diagram of an optical disc device 800 according to a fifth embodiment of the present invention. In FIG. 8, the same constituents as those of the optical disc devices according to the first to fourth embodiments are given the same reference numerals to omit description thereof.

In FIG. 8, reference numeral 62 denotes an amplitude phase error detection means which detects deviations from arbitrarily set reference positions at a leading edge and a trailing edge, respectively, as deviations not in the time axis direction (timing) but in the amplitude axis direction, and converts the deviations into phase errors. While in the above-described first to fourth embodiments a phase error is detected as timing information, there is a case where a phase error cannot be directly measured as timing information as in the digital reproduction mode. In such case, the amplitude phase error detection means 62 detects a phase error using the amplitude information instead of the timing information.

The amplitude phase error detection method by the amplitude phase error detection means 62 will be described with reference to FIG. 19(a).

In FIG. 19(a), using two sample data A_812 and B_813 sandwiching 0 reference level 814, a point 815 at which the two sample data intersects the 0 reference level 814 is obtained. The intersection point 815 is given by an arbitrary function. How far the intersection point 815 is apart from the center of one period of the clock is used as an index to obtain a timing phase error from an amplitude phase error.

Further, an amplitude phase error detection method different from the above-described method will be described with reference to FIG. 19(b).

In FIG. 19(b), sample data C_816 is on a point which is sampled by a method controlling so that it constantly exists on a point intersecting the 0 reference level 814. How far the sample data C_816 is apart from the 0 reference level 814 can be used as an index corresponding to the phase error amount of timing.

While in this fifth embodiment the LPC 72 is provided as in the second embodiment, the recording timing signal 201 may be directly input to the optical pickup (OPU) 92 as in the first embodiment. Further, the optical disc device of this fifth embodiment may be provided with the recording pattern generation means 73 described in the third embodiment, instead of the data encoder 71.

Next, the operation will be described.

When recording data is transferred from the data encoder 71 to the recording timing setting means 2, a recording timing signal 201 is generated under the prescribed recording condition by the recording timing setting means 2. Since recorded data to be corrected does not exist on the DISC 7 at the first-time recording, the value of the recording timing correction signal 501 is not reflected to the recording timing signal 201 as described in the first embodiment.

After optimization of the laser power with respect to the recording timing signal 201 is performed by the LPC 72, a laser pulse is emitted from the OPU 91 to the DISC 7, and thereby data are recorded on the DISC 7. The data recorded on the DISC 7 are reproduced by the OPU 91, and a reproduction signal 811 is outputted to the phase error detection means 3.

In the amplitude phase error detection means 62, the information of the reproduction signal 811 in the amplitude direction is converted into the information in the time axis direction, thereby to detect a phase error. Further, in the phase error polarity detection means 6, the polarities of deviations from the reference position of the PIT 82 at the leading edge and the trailing edge are judged, respectively, and the results are outputted to the error convergence means 4.

In the error convergence means 4, error information 401 is generated based on the phase error with the positive and negative polarities under the control of the control means 51, and outputted to the recording timing calculation means 5. In the recording timing calculation means 5, a recording timing correction signal 501 is generated based on the error information 401, and outputted to the control means 51.

Thereafter, as described in the first embodiment, it is judged by the control means 51 as to whether the recording timing setting condition complies with the termination condition or not under the prescribed convergence condition. When the termination condition is not satisfied, the recording timing correction signal 501 is set in the recording timing setting means 2, and a recording timing signal 201 including a deviation from the reference position of the data to be recorded is generated by the recording timing setting means 2. Then, the above-described operation is repeatedly performed until the recording timing satisfies the desired requirements under the control of the control means 51, and thus an optimum recording condition is derived.

As described above, according to the optical disc device of the fifth embodiment, an error between the physical position (size) where a recording mark should be properly located and the actually recorded mark is detected, and information representing this deviation in mark formation is fed back to the recording timing setting means to set an optimum recording condition, and thus data can be recorded with stable high quality.

At this time, since the optical disc device of the fifth embodiment detects the phase error using the amplitude information instead of the timing information, even when the phase error cannot be directly measured as the timing information as in the case of processing in the digital reproduction mode, it is possible to detect the phase error and optimize the recording timing by the feedback control using the phase error.

Embodiment 6

Figure 9:
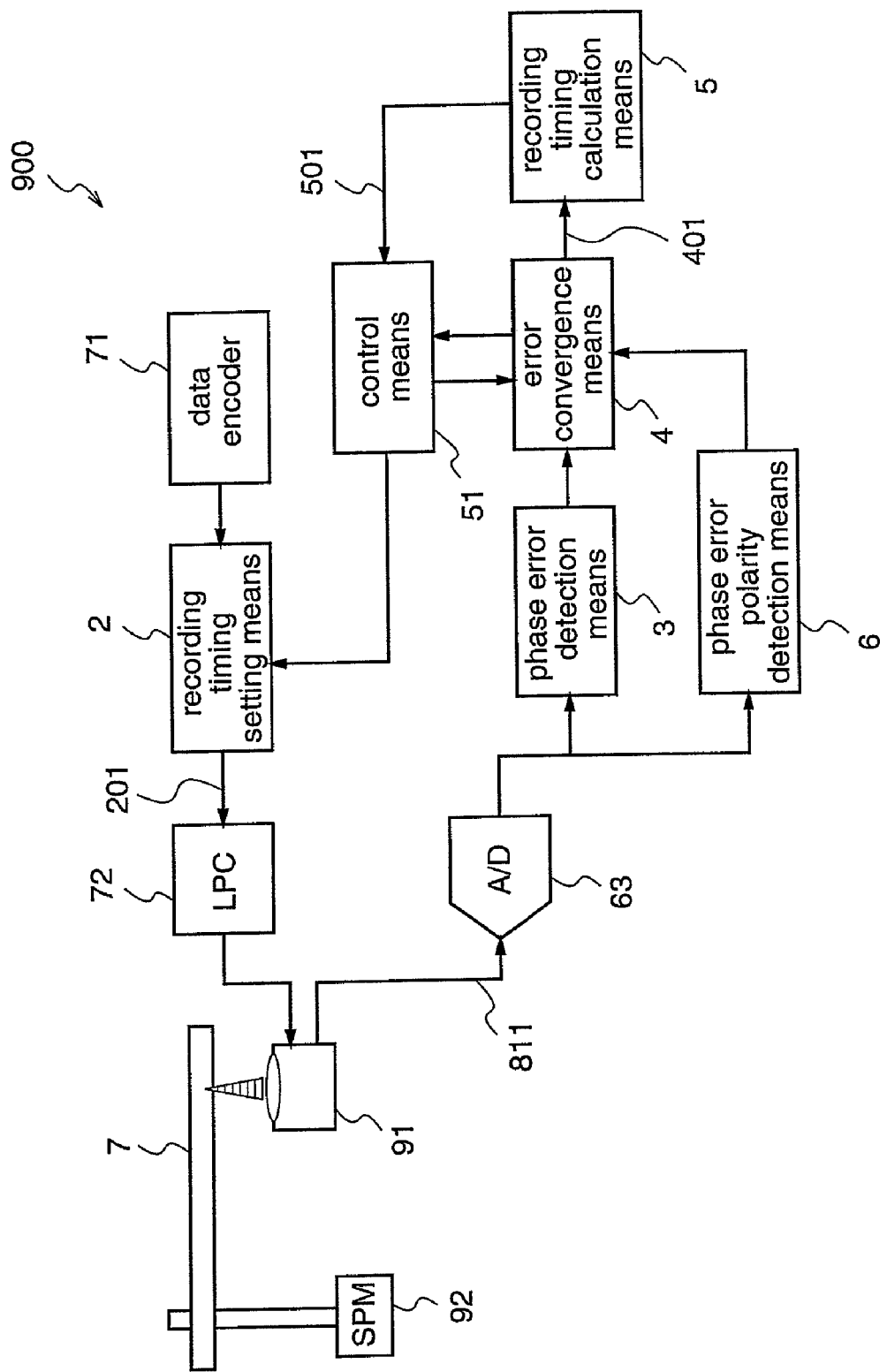
FIG. 9 is a block diagram illustrating an optical disc device according to a sixth embodiment of the present invention.

FIG. 9 is a block diagram of an optical disc device 900 according to a sixth embodiment of the present invention. In FIG. 9, the same constituents as those in the optical disc devices according to the first to fifth embodiments are given the same reference numerals to omit description thereof.

In FIG. 9, reference numeral 63 denotes an A/D converter which converts the reproduction signal 811 outputted from the OPU into a digital signal. In this sixth embodiment, the phase error detection means 3, the phase error polarity detection means 6, and the error convergence means 4 perform their processes in digital mode.

While in this sixth embodiment the LPC 72 is provided as in the second embodiment, the recording timing signal 201 may be directly input to the optical pickup (OPU) 92 as in the first embodiment.

Next, the operation will be described.

When recording data is transferred from the data encoder 71 to the recording timing setting means 2, a recording timing signal 201 is generated under the prescribed recording condition by the recording timing setting means 2. Since recorded data to be corrected does not exist on the DISC 7 at the first-time recording, the value of the recording timing correction signal 501 is not reflected to the recording timing signal 201 as described in the first embodiment.

After optimization of the laser power with respect to the recording timing signal 201 is performed by the LPC 72, a laser pulse is emitted from the OPU 91 to the DISC 7, and thereby data are recorded on the DISC 7. The data recorded on the DISC 7 are reproduced by the OPU 91, and a reproduction signal 811 is outputted to the phase error detection means 3.

The data recorded on the DISC 7 are reproduced by the OPU 91, and a reproduction signal 811 is generated. The reproduction signal 811 being an analog signal is converted into a digital value by the A/D converter 63, and the digital-converted reproduction signal is outputted to the phase error detection means 3 and to the phase error polarity detection means 6.

In the phase error detection means 3, a phase error between the normal PIT position and the reproduction signal 811 is detected as a digital value, based on two sample values crossing a zero-cross point. Further, in the phase error polarity detection means 6, the deviations from the reference position of the PIT 82 at the leading edge and the trailing edge are treated as digital values, and the positive or negative polarity is judged as a deviation from a prescribed reference to be outputted to the error convergence means 4.

In the error convergence means 4, error information 401 is generated by digital processing based on the phase error with the positive/negative polarity under the control of the control means 51, and outputted to the recording timing calculation means 5. In the recording timing calculation means 5, a recording timing correction signal 501 is generated based on the error information 401, and outputted to the control means 51.

Thereafter, as described in the first embodiment, it is judged by the control means 51 as to whether the recording timing setting condition complies with condition complies with the termination condition or not under the prescribed convergence condition. When the termination condition is not satisfied, the recording timing correction signal 501 is set in the recording timing setting means 2, and a recording timing signal 201 including a deviation from the reference position of the data to be recorded is generated by the recording timing setting means 2.

Then, the above-described operation is repeatedly carried out until the recording timing satisfies the desired requirements under the control of the control means 51, and thus an optimum recording condition is derived.

As described above, according to the optical disc device of the sixth embodiment, an error between the physical position (size) where a recording mark should be properly located and the actually recorded mark is detected, and information representing this deviation in mark formation is fed back to the recording timing setting means to set an optimum recording condition, and thus data can be recorded with stable high quality.

At this time, since the optical disc device of this sixth embodiment performs the phase error detection and the phase correction amount calculation in digital mode, speed-up of calculation can be achieved, and thereby the time required for the recording timing setting can be reduced. Further, since a PLL circuit for generating a clock for phase error measurement is not required in contrast to the case of performing analog processing, the circuit scale can be reduced.

Figure 10:
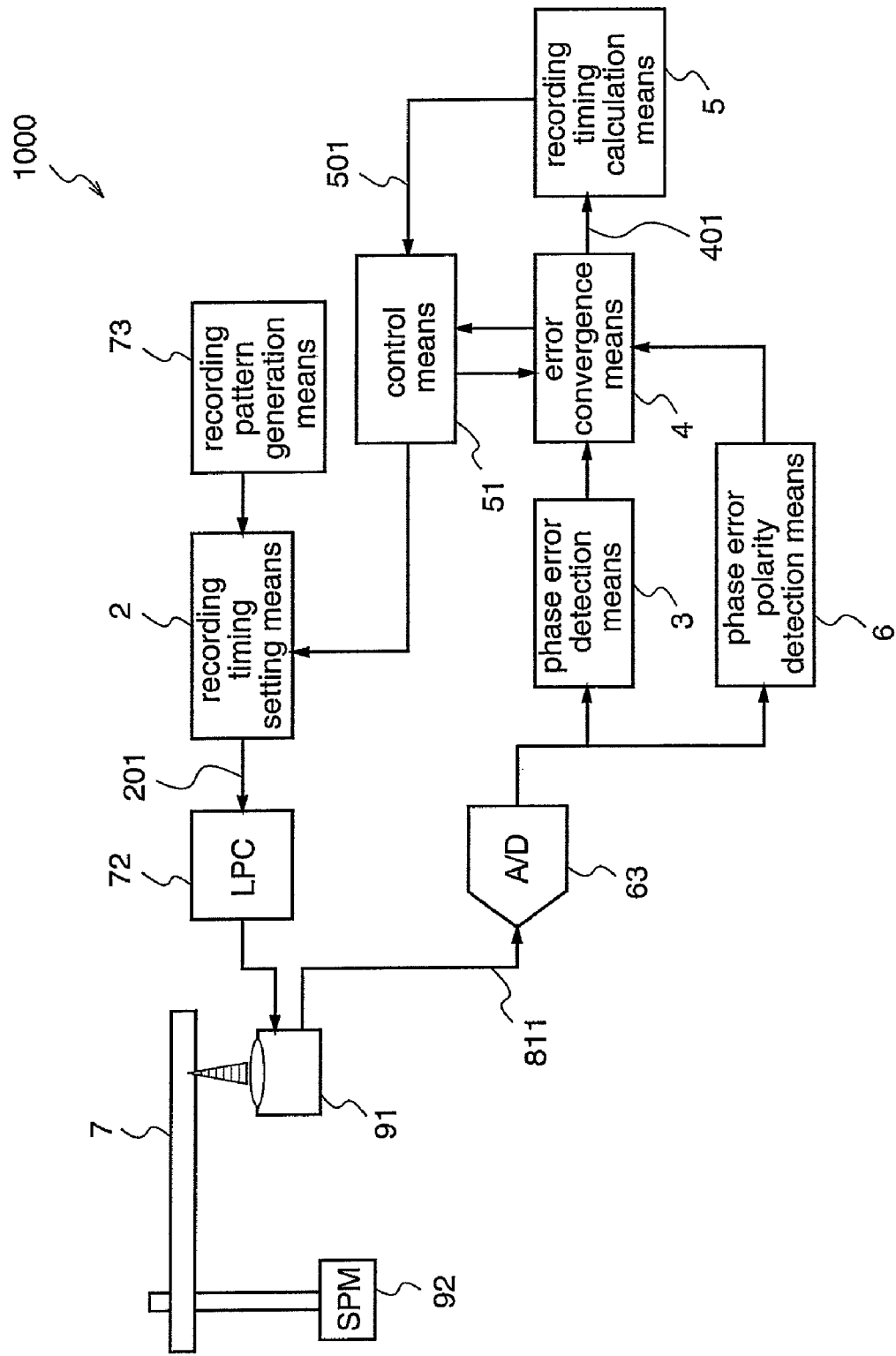
FIG. 10 is a block diagram illustrating a modification of the optical disc device according to the fourth embodiment.

The optical disc device of this sixth embodiment may be provided with the recording pattern generation means 73 described in the third embodiment instead of the data encoder 71 as shown in FIG. 10. Thereby, the phase error detection and the formation of the error information 401 can be performed in digital mode based on the efficient specific pattern which can accurately detect a phase error in a short time, and thus the time required for the recording timing setting can be further reduced.

Embodiment 7

Figure 11:
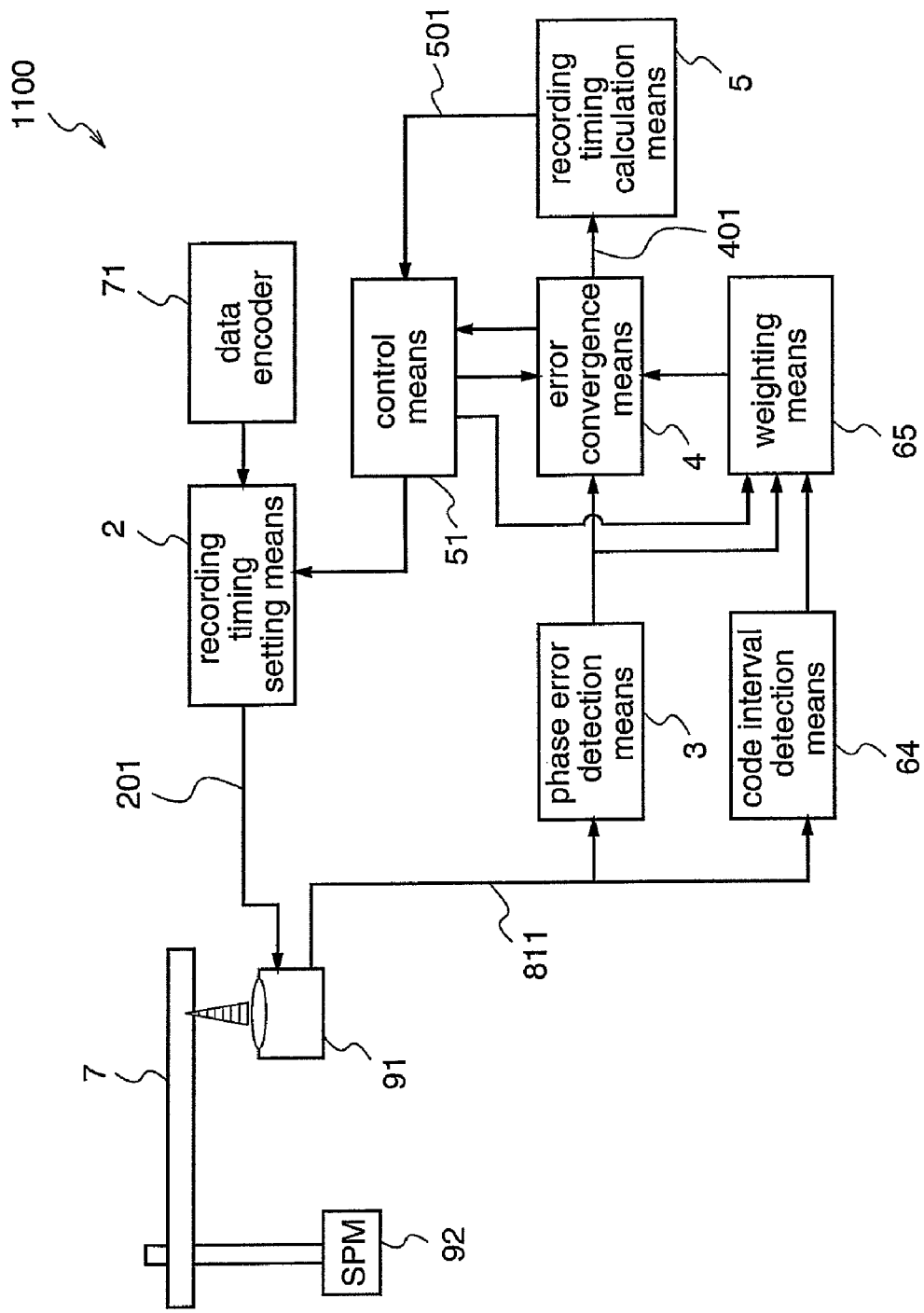
FIG. 11 is a block diagram illustrating an optical disc device according to a seventh embodiment of the present invention.

FIG. 11 is a block diagram illustrating an optical disc device 1100 according to a seventh embodiment of the present invention. In FIG. 11, the same constituents as those of the optical disc devices according to the first to sixth embodiments are given the same reference numerals to omit description thereof.

In FIG. 11, reference numeral 64 denotes a code interval detection means which detects an interval between codes which are combinations of marks and spaces.

Reference numeral 65 denotes a weighting means which performs weighting onto the phase error signal outputted from the phase error detection means 3, according to the code interval or the phase error amount, and outputs the weighted phase error signal to the error convergence means 4. As for a method of this weighting, there may be adopted a method of performing weighting according to the appearance probability of data patterns to be recorded, assuming that all the data patterns should appear evenly, or a method of performing weighting according to the length of a space positioned in front of a recording mark, or a method of performing weighting according to the result of the phase error detection to shorten the convergence time. These weighting methods are switched by the control means 51 according to the type or speed of media.

While in this seventh embodiment the LPC 72 is provided as in the second embodiment, the recording timing signal 201 may be directly input to the optical pickup (OPU) 92 as in the first embodiment. Further, the optical disc device of this seventh embodiment may be provided with the recording pattern generation means 73 described in the third embodiment, instead of the data encoder 71.

Next, the operation will be described.

When recording data is transferred from the data encoder 71 to the recording timing setting means 2, a recording timing signal 201 is generated under the prescribed recording condition by the recording timing setting means 2. Since recorded data to be corrected does not exist on the DISC 7 at the first-time recording, the value of the recording timing correction signal 501 is not reflected to the recording timing signal 201 as described in the first embodiment.

After optimization of the laser power with respect to the recording timing signal 201 is performed by the LPC 72, a laser pulse is emitted from the OPU 91 to the DISC 7, and thereby data are recorded on the DISC 7. The data recorded on the DISC 7 are reproduced by the OPU 91, and a reproduction signal 811 is outputted to the phase error detection means 3.

In the phase error detection means 3, a phase error between the normal PIT position and the reproduction signal 811 is detected and outputted to the error convergence means 4 and to the weighting means 65. Further, in the code interval detection means 64, a code interval (specifically, an interval between a PIT and a PIT) is detected and outputted to the weighting means 65.

In the weighting means 65, weighting is performed onto the phase error signal by a predetermined weighting method according to the phase error amount or the code interval under the control of the control means 51, and the weighted phase error signal is outputted to the error convergence means 4.

In the error convergence means 4, error information 401 is generated based on the output of the weighting means 65 so that the PIT position is converged to the normal position. Then, in the recording timing calculation means 5, a timing correction amount required for correcting the phase error is calculated.

Thereafter, as described in the first embodiment, it is judged by the control means 51 as to whether the recording timing setting condition complies with the termination condition or not under the prescribed convergence condition. When the termination condition is not satisfied, the recording timing correction signal 501 is set in the recording timing setting means 2, and a recording timing signal 201 including a deviation from the reference position of the data to be recorded is generated by the recording timing setting means 2. Then, the above-described operation is repeatedly performed until the recording timing satisfies the desired requirements under the control of the control means 51, and thus an optimum recording condition is derived.

As described above, according to the optical disc device of the seventh embodiment, an error between the physical position (size) where a recording mark should be properly located and the actually recorded mark is detected, and information representing this deviation in mark formation is fed back to the recording timing setting means to set an optimum recording condition, and thus data can be recorded with stable high quality.

At this time, in the optical disc device of the seventh embodiment, the detected phase error is weighted according to the phase error or the data pattern to be recorded, and the error information is generated based on the weighted phase error to determine a recording timing correction amount. Therefore, the phase error amount can be converged to the target value in a short time regardless of the pattern of the data outputted from the data encoder, and thereby the time required for the recording timing setting can be reduced.

Embodiment 8

In an eighth embodiment of the present invention, a description will be given of specific examples of optimum recording condition searching processes adopted in the optical disc devices according to the first to seventh embodiments described above.

FIGS. 12, 13, 14, 15, 16, and 17 are flowcharts for explaining the optimum recording condition searching processes according to the eighth embodiment. While the first to sixth optimum recording condition searching processes described below are to be performed in the optical disc device 100 of the first embodiment, the optimum recording condition search processes of this eighth embodiment can be performed also in the optical disc devices of the second to seventh embodiments.

First of all, the first optimum recording condition searching method will be described.

Figure 12:
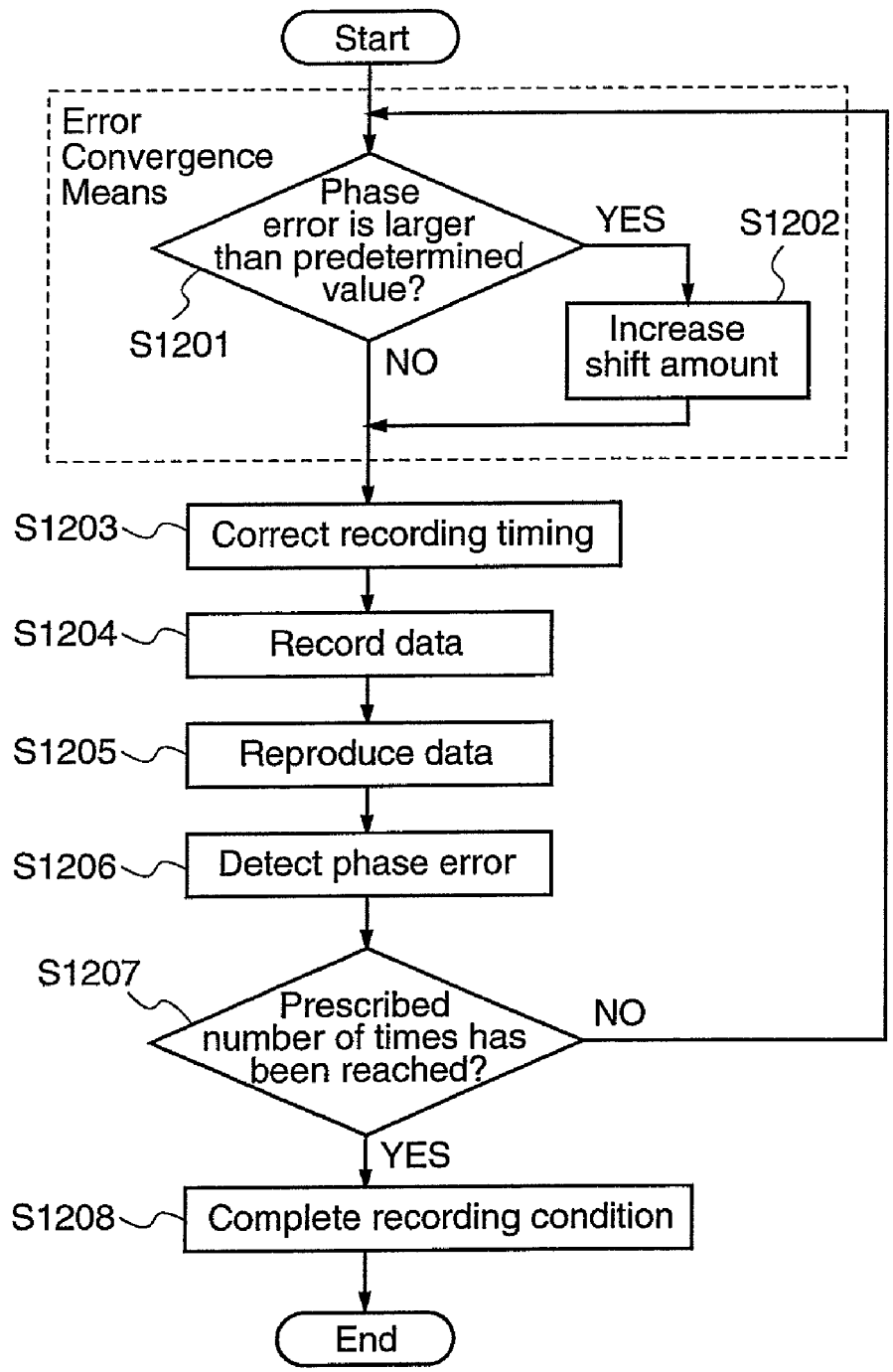
FIG. 12 is a flowchart illustrating a first optimum recording condition searching method according to an eighth embodiment of the present invention.

FIG. 12 is a flowchart for explaining the first optimum recording condition searching method.

In the optical disc device 100 of the first embodiment, when the phase error detected by the phase error detection means 3 is input to the error convergence means 4, the error convergence means 4 judges whether the phase error amount is larger or smaller than an arbitrary prescribed value (step S1201).

When the phase error amount is larger than the prescribed value, the shift amount of the recording timing is largely changed (step S1202), and when it is smaller than the prescribed value, the shift amount is set to a prescribed value or a separately provided value, and error information 401 obtained as a result is outputted to the recording timing calculation means 5.

The control means 51 sets the correction parameter calculated by the recording timing calculation means 5 in the recording timing setting means 2 (step S1203), and records data for obtaining an optimum condition on the DISC 7 under a new condition (step S1204). Then, the OPU 91 reproduces the recorded data (step S1205), and the phase error detection means 3 detects a phase error (step S1206).

The control means 51 judges whether the number of settings of the correction parameter in the recording timing setting means 2 (number of trials) has reached an arbitrary prescribed number of times or not (step S1207), and when the number of trials has reached the prescribed number of times, the control means 51 terminates the measurement to hold the recording condition at that time as an optimum recording condition (step S1208). On the other hand, when it is judged in step S1207 that the number of trials has not yet reached the prescribed number of times, the control means 51 returns to step 1201 to derive an optimum recording condition according to the above-mentioned flowchart.

As described above, in the first optimum recording condition searching method, since the phase error convergence means 4 changes the shift amount of the recording timing according to the phase error amount, and derives an optimum recording condition based on the number of trials, searching for the optimum recording condition can be executed in a short time.

Next, the second optimum recording condition searching method will be described.

Figure 13:
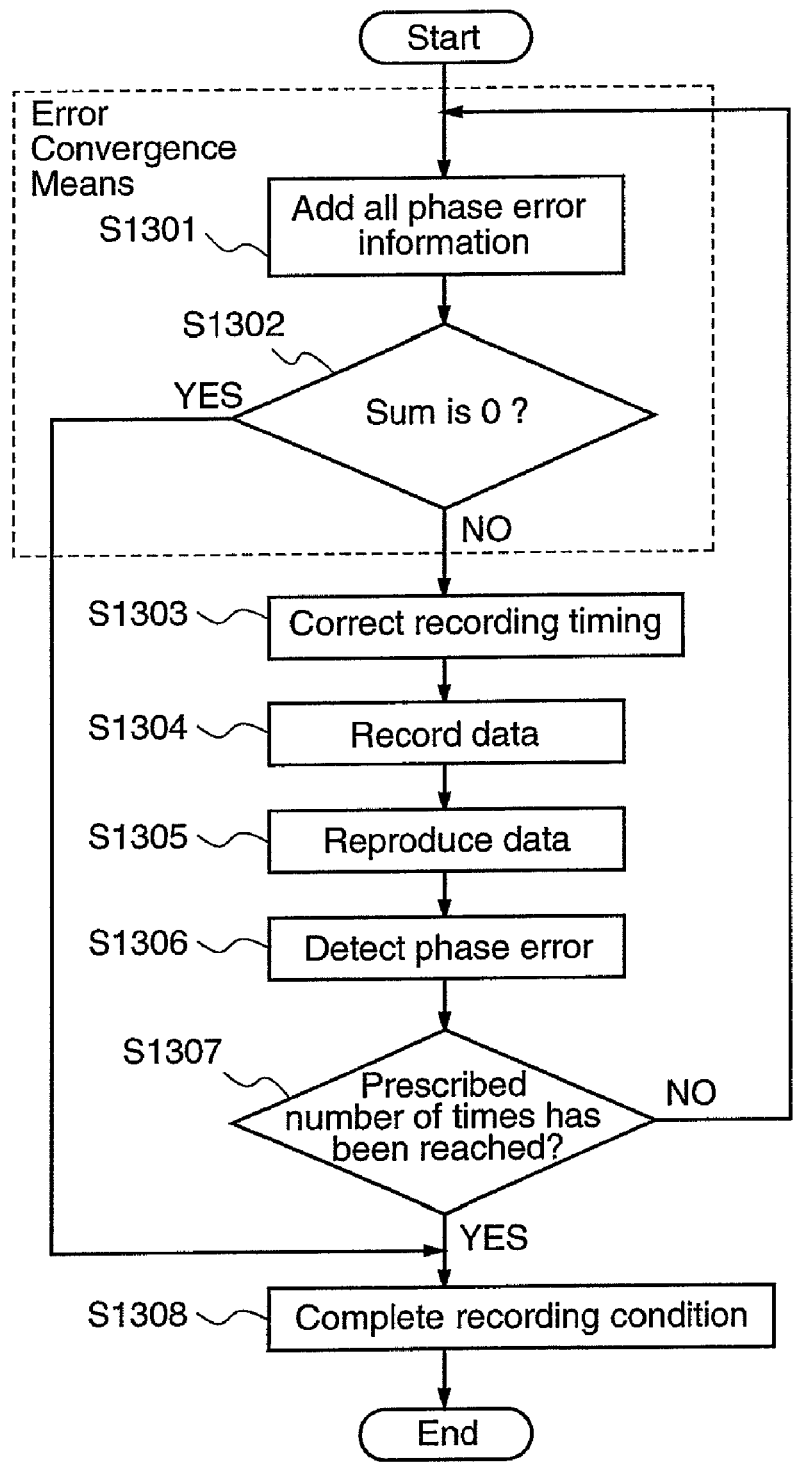
FIG. 13 is a flowchart illustrating a second optimum recording condition searching method according to the eighth embodiment of the present invention.

FIG. 13 is a flowchart for explaining the second optimum recording condition searching method.

In the optical disc device 100 of the first embodiment, when the phase errors detected by the phase error detection means 3 are input to the error convergence means 4, the error convergence means 4 adds all the phase errors detected by the phase error detection means 3 (step S1301), and judges whether the amount of the added phase errors is 0 or not (step S1302).

When the phase error amount is 0, the control means 51 judges that an optimum condition is obtained and holds the recording condition at that time as an optimum recording condition (step S1308), thereby to terminate this process.

On the other hand, when the phase error amount is not 0, the control means 51 sets the correction parameter calculated by the recording timing calculation means 5 in the recording timing setting means 2 (step S1303), and records data for obtaining an optimum condition on the DISC 7 under a new condition (step S1304). Then, the OPU 91 reproduces the recorded data (step S1305), and the phase error detection means 3 detects a phase error (step S1306).

The control means 51 judges whether the number of settings of the correction parameter in the recording timing setting means 2 (number of trials) has reached an arbitrary prescribed number of times or not (step S1307), and when the number of trials has reached the prescribed number of times, the control means 51 terminates the measurement to hold the recording condition at that time as an optimum recording condition (step S1308). On the other hand, when it is judged in step S1307 that the number of trials has not yet reached the prescribed number of times, the control means 51 returns to step 1301 to derive an optimum recording condition according to the above-mentioned flowchart.

As described above, in the second optimum recording condition searching method, since the optimum recording condition is derived according to whether the phase error has become 0 or not and the number of trials, the optimum recording condition can be searched with high accuracy.

Next, the third optimum recording condition searching method will be described.

Figure 14:
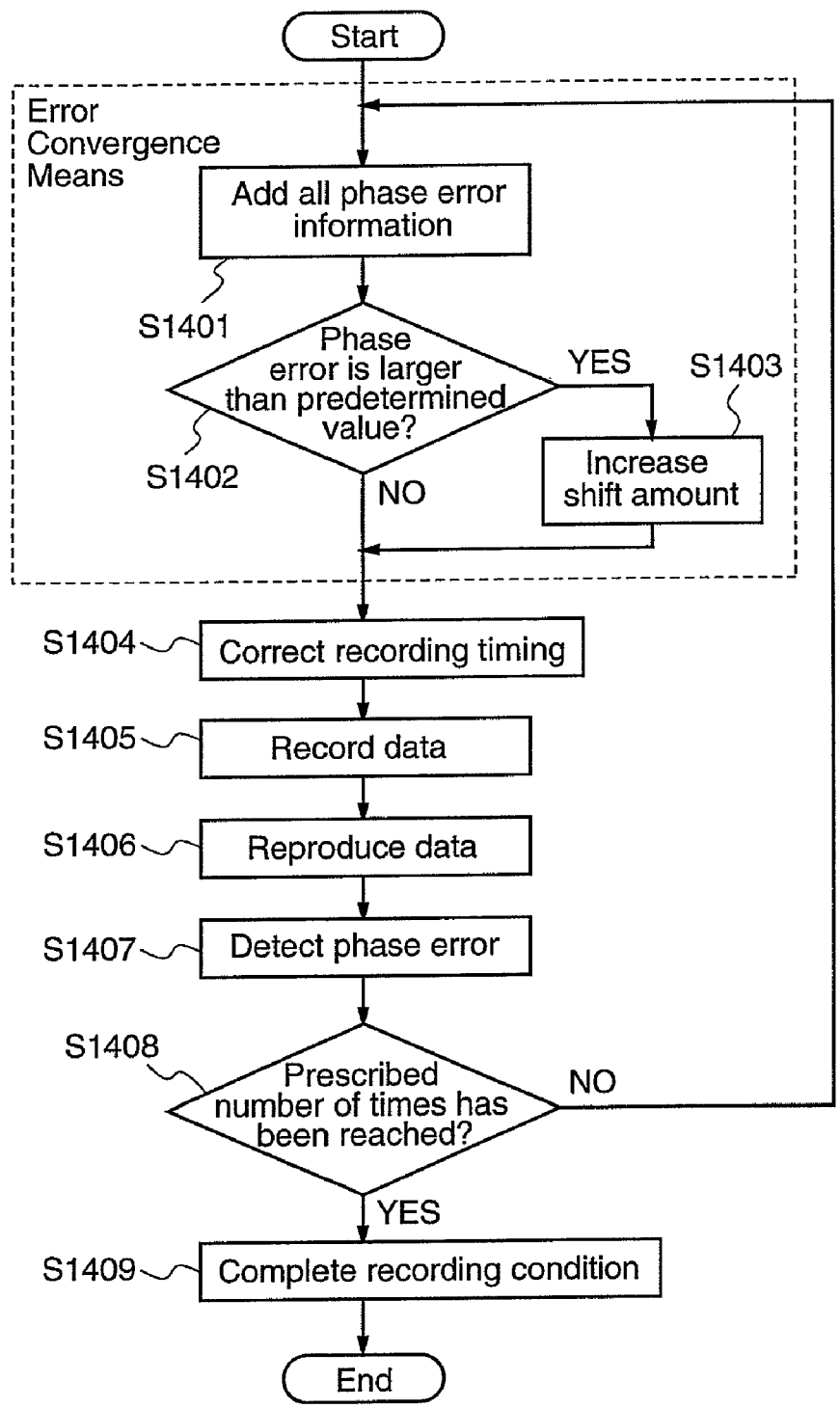
FIG. 14 is a flowchart illustrating a third optimum recording condition searching method according to the eighth embodiment of the present invention.

FIG. 14 is a flowchart for explaining the third optimum recording condition searching method.

In the optical disc device 100 of the first embodiment, when the phase errors detected by the phase error detection means 3 are input to the error convergence means 4, the error convergence means 4 adds all the phase errors detected by the phase error detection means 3 (step S1401), and judges whether the amount of the added phase errors is larger or smaller than a prescribed value (step S1402).

When the phase error amount is larger than the prescribed value, the shift amount of the recording timing is largely changed (step S1403), and when it is smaller than the prescribed value, the shift amount is set to a prescribed value or a separately provided value, and error information 401 obtained as a result is outputted to the recording timing calculation means 5.

The control means 51 sets the correction parameter calculated by the recording timing calculation means 5 in the recording timing setting means 2 (step S1404), and records data for obtaining an optimum condition on the DISC 7 under a new condition (step S1405). Then, the OPU 91 reproduces the recorded data (step S1406), and the phase error detection means 3 detects a phase error (step S1407).

The control means 51 judges whether the number of settings of the correction parameter in the recording timing setting means 2 (number of trials) has reached an arbitrary prescribed number of times or not (step S1408), and when the number of trials has reached the prescribed number of times, the control means 51 terminates the measurement to hold the recording condition at that time as an optimum recording condition (step S1409). On the other hand, when it is judged in step S1408 that the number of trials has not yet reached the prescribed number of times, the control means 51 returns to step 1401 to derive an optimum recording condition according to the above-mentioned flowchart.

As described above, in the third optimum recording condition searching method, since the phase error convergence means 4 adds all the phase errors detected for the respective data patterns, changes the shift amount of the recording timing according to the amount of the added phase errors, and derives an optimum recording condition based on the number of trials, the optimum recording condition can be searched with high accuracy in a short time.

Next, the fourth optimum recording condition searching method will be described.

Figure 15:
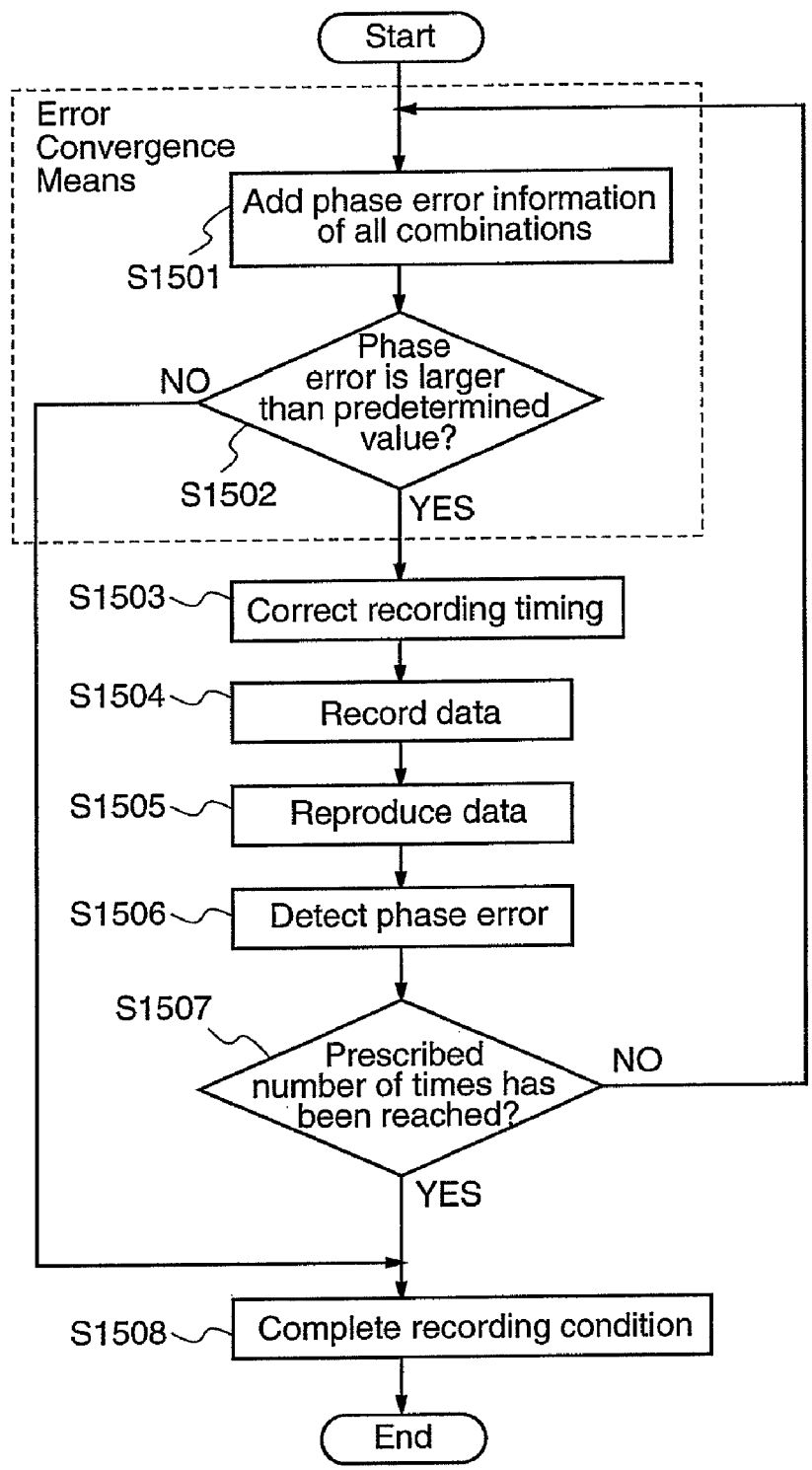
FIG. 15 is a flowchart illustrating a fourth optimum recording condition searching method according to the eighth embodiment of the present invention.

FIG. 15 is a flowchart for explaining the fourth optimum recording condition searching method.

In the optical disc device 100 of the first embodiment, when the phase errors detected by the phase error detection means 3 are input to the error convergence means 4, the error convergence means 4 adds the phase errors detected by the phase error detection means 3 for each combination of data patterns (step S1501), and judges whether the phase error amount of each data pattern is larger or smaller than an arbitrary prescribed value (step S1502).

When it is judged in step S1502 that the phase error amounts of all the combinations of data patterns are smaller than the prescribed value, the control means 51 judges that an optimum condition is obtained and holds the recording condition at that time as an optimum recording condition (step S1508), thereby to terminate the process.

On the other hand, when it is judged in step S1502 that the phase error amount of a specific data pattern is larger than the prescribed value, the control means 51 sets the correction parameter calculated for this data pattern in the recording timing setting means 2 (step S1503), and records data for obtaining an optimum condition on the DISC 7 under a new condition (step S1504). At this time, further phase shift of the recording timing is not performed for the combinations of data patterns whose recording conditions have been judged as completed (whose phase error amounts are smaller than the prescribed value). If the phase error amount of the combination of data patterns for which correction has once been completed deviates from the termination condition, phase shift may be performed again to search for an optimum condition.

Thereafter, the OPU 91 reproduces the recorded data (step S1505), and the phase error detection means 3 detects a phase error (step S1506).

The control means 51 judges whether the number of settings of the correction parameter in the recording timing setting means 2 (number of trials) has reached an arbitrary prescribed number of times or not (step S1507), and when the number of trials has reached the prescribed number of times, the control means 51 terminates the measurement to hold the recording condition at that time as an optimum recording condition (step S1508). On the other hand, when it is judged in step S1507 that the number of trials has not yet reached the prescribed number of times, the control means 51 returns to step 1501 to derive an optimum recording condition according to the above-mentioned flowchart.

As described above, in the fourth optimum recording condition searching method, the optimum recording conditions are obtained for the respective data patterns, and recording timing corrections for these data patterns are successively halted in the order of the recording conditions being converged, and thus the recording conditions can be set more accurately.

Next, the fifth optimum recording condition searching method will be described.

Figure 16:
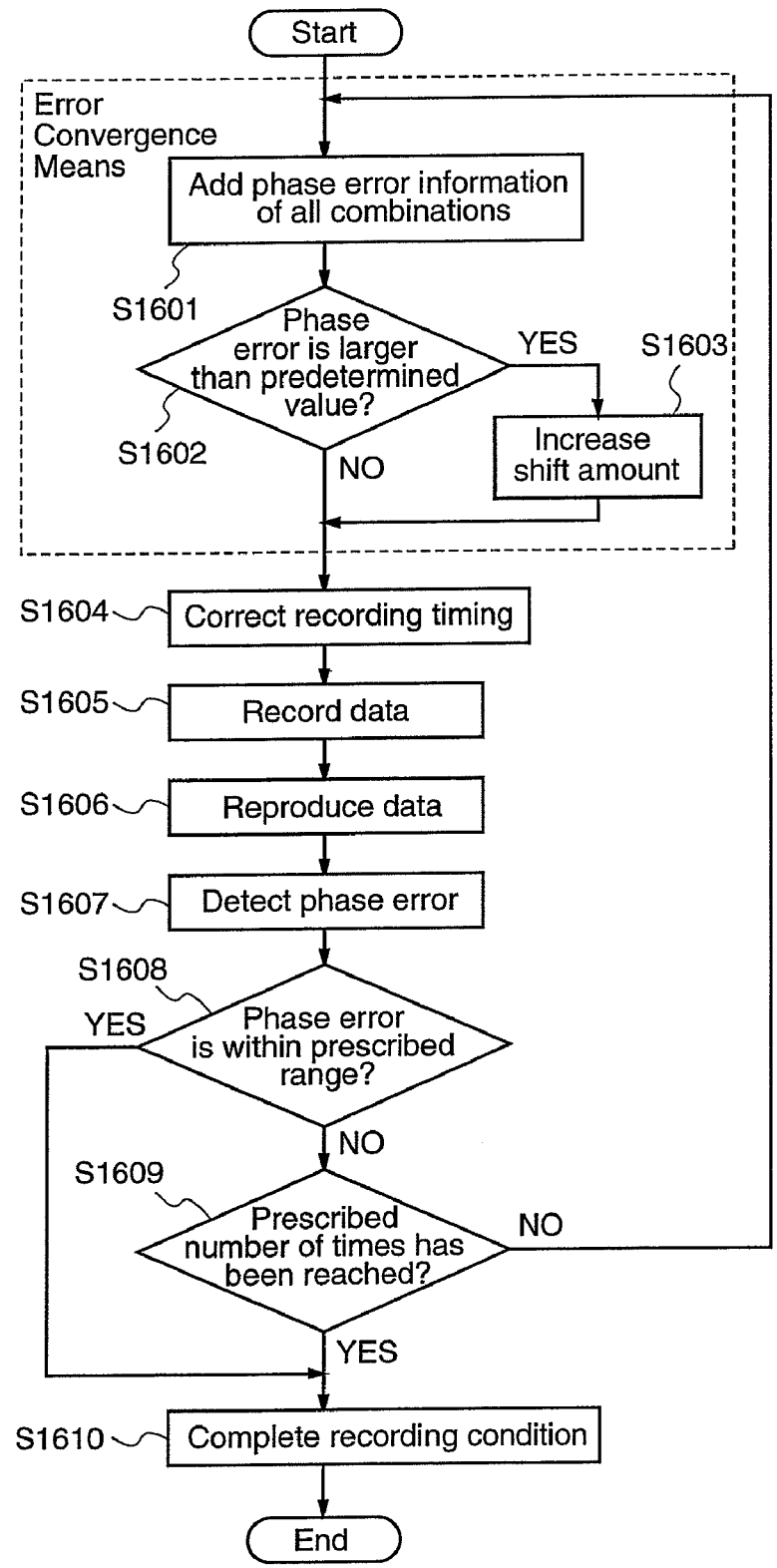
FIG. 16 is a flowchart illustrating a fifth optimum recording condition searching method according to the eighth embodiment of the present invention.

FIG. 16 is a flowchart for explaining the fifth optimum recording condition searching method.

In the optical disc device 100 of the first embodiment, when the phase errors detected by the phase error detection means 3 are input to the error convergence means 4, the error convergence means 4 adds the phase errors detected by the phase error detection means 3 for each combination of data patterns, and judges whether the phase error amount of each data pattern is larger or smaller than an arbitrary prescribed value (step S1602).

The shift amount of the recording timing is largely changed for the data pattern whose phase error amount is larger than the prescribed value (step S1603), while the shift amount is set to a prescribed value or a separately provided value for the data pattern whose phase error amount is smaller than the prescribed value, and error information 401 obtained as a result is outputted to the recording timing calculation means 5.

The control means 51 sets the correction parameter calculated by the recording timing calculation means 5 in the recording timing setting means 2 (step S1604), and records data for obtaining an optimum condition on the DISC 7 under a new condition (step S1605). Then, the OPU 91 reproduces the recorded data (step S1606), and the phase error detection means 3 detects a phase error (step S1607).

The control means 51 judges whether the phase error amounts of the respective data patterns detected by the phase error detection means 3 are within an arbitrary prescribed range or not (step S1608). Based on the result of the judgment in step S1608, when all the combinations are within the prescribed range, searching for an optimum condition is terminated (step S1609). On the other hand, when all the combinations are not within the prescribed range, it is judged whether the number of settings of the correction parameter in the recording timing setting means 2 (number of trials) has reached an arbitrary prescribed number of times or not (step S1609), and when the number of trials has reached the prescribed number of times, the measurement is terminated to hold the recording condition at that time as an optimum recording condition (step S1610).

On the other hand, when the number of trials has not yet reached the prescribed number of times, the control means 51 returns to step S1601 to continue searching for an optimum condition until the next condition is satisfied. At this time, further phase shift of the recording timing is not performed for the data patterns whose recording conditions are judged as completed, and recording timing corrections for these data patterns are successively halted in the order of the recording conditions being converged, and thus an optimum recording condition is derived according to the above-described procedure.

As for the process of step S1608, a plurality of stages may be provided for each combination of data patterns, and the convergence condition of searching may be determined according to the frequency of occurrence of phase errors or the number of continuous phase errors for each stage. For example, arbitrary values A and B or at least one more value n (A<B< . . . <n) as references are set for each of the phase errors in all the combinations of data patterns. When a phase error equal to or smaller than A is obtained in a certain data pattern, its recording condition is held as a final value, and the recording condition of this data pattern is not shifted thereafter. When all the phase errors finally become equal to or smaller than A, the recording condition at that time is regarded as the final recording condition. Alternatively, when a phase error in a certain data pattern is within the condition not smaller than A and not larger than B and the sum of the phase errors of all the combinations is converged to a predetermined reference value or below, the recording condition at that time is regarded as an optimum recording condition, and corrections for the data patterns are successively halted in the order of the recording conditions converged. At this time, when the number of detections (number of trials) has reached an arbitrary prescribed number of times, the measurement is terminated to hold the recording condition at that time as an optimum recording condition. When the number of trials has not yet reached the prescribed number of times, an optical recording condition is derived again according to the above-mentioned procedure.

As described above, in the fifth optimum recording condition searching method, an optimum recording condition is obtained for each data pattern, and the error convergence means 4 changes the shift amount according to the phase error amount to derive an optimum recording condition based on the detected phase error and the number of trials. Therefore, the time required for the optimum recording condition searching can be reduced, and the accuracy thereof can be enhanced.

Next, the sixth optimum recording condition searching method will be described.

Figure 17:
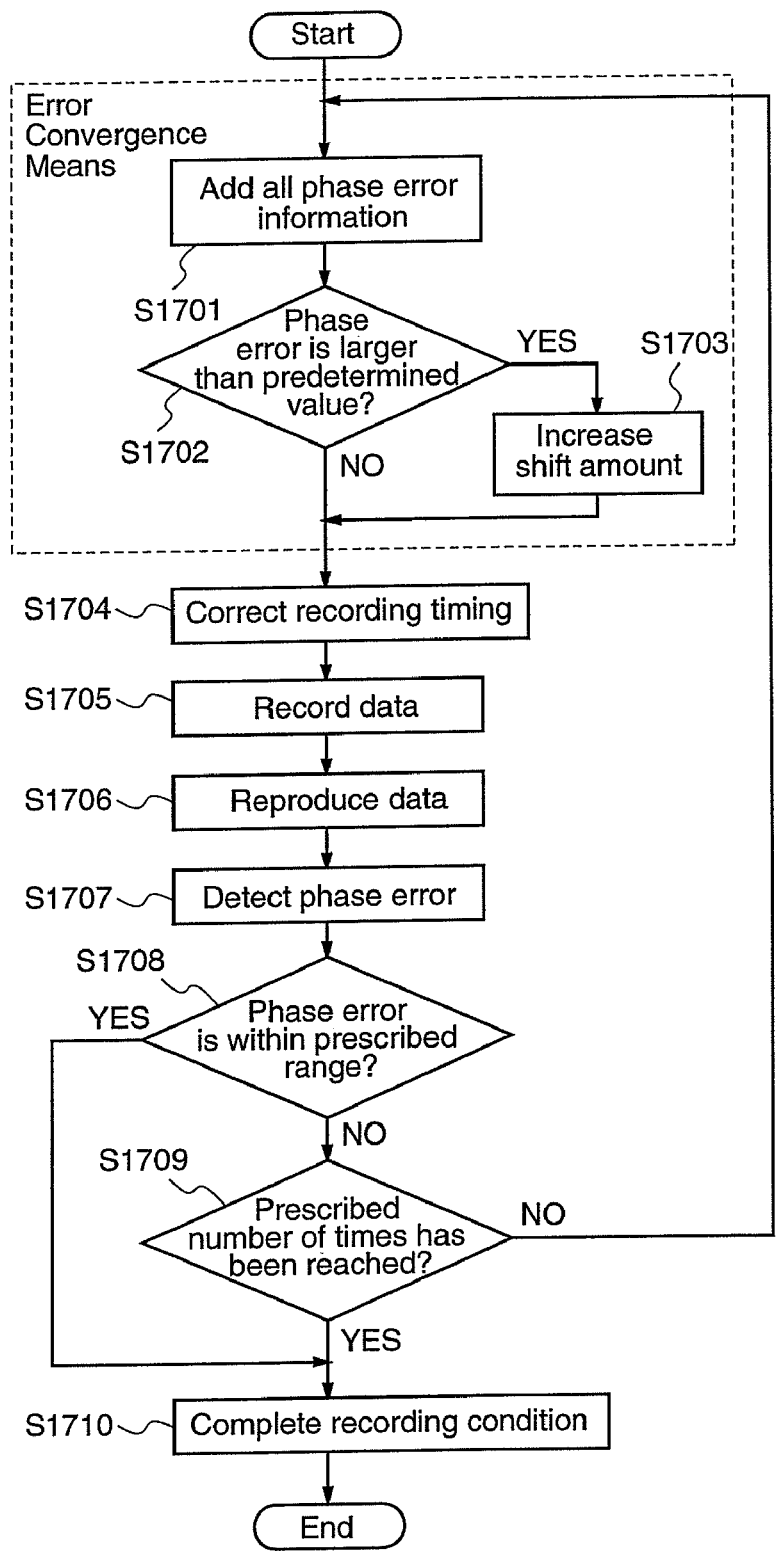
FIG. 17 is a flowchart illustrating a sixth optimum recording condition searching method according to the eighth embodiment of the present invention.

FIG. 17 is a flowchart for explaining the sixth optimum recording condition searching method.

In the optical disc device 100 of the first embodiment, when the phase errors detected by the phase error detection means 3 are input to the error convergence means 4, the error convergence means 4 adds all the phase errors detected by the phase error detection means 3 (step S1701), and judges whether the amount of the added phase errors is larger or smaller than an arbitrary prescribed value (step S1702).

When the phase error amount is larger than the prescribed value, the shift amount of the recording timing is largely changed (step S1703), and when the phase error amount is smaller than the prescribed value, the shift amount is set to a prescribed value or a separately provided value, and error information 401 obtained as a result is outputted to the recording timing calculation means 5.

The control means 51 sets the correction parameter calculated by the recording timing calculation means 5 in the recording timing setting means 2 (step S1704), and records data for obtaining an optimum condition on the DISC 7 under a new condition (step S1705). Then, the OPU 91 reproduces the recorded data (step S1706), and the phase error detection means 3 detects a phase error (step S1707).

The control means 51 judges whether the phase error amount detected by the phase error detection means 3 is within an arbitrary prescribed range or not (step S1708), and when the phase error amount is within the prescribed range, the control means 51 terminates the searching for an optimum condition (step S1710). When the phase error amount is not within the prescribed range, the control means 51 judges whether the number of detections (number of trials) has reached an arbitrary prescribed number of times or not (step S1709). When it is judged in step S1709 that the number of trials has reached the prescribed number of times, the control means 51 terminates the measurement to hold the recording condition at that time as an optimum recording condition (step S1710).

On the other hand, when the number of trials has not yet reached the prescribed number of times, the control means 51 returns to step S1701 to continue searching for an optimum condition until the next condition is satisfied, and halts the searching when the recording condition is converged.

As described above, in the sixth optimum recording condition searching method, the error convergence means 4 changes the shift amount according to the phase error amount, and derives an optimum recording condition based on the detected phase error and the number of trials. Therefore, the time required for the optimum recording condition searching can be reduced, and the accuracy thereof can be enhanced.

As described above, according to the optimum recording condition searching method of this eighth embodiment, in the optical disc devices of the first to seventh embodiments, an error between the physical position (size) where a recording mark should be properly located and the actually recorded mark is detected, and information representing this deviation in mark formation is fed back to the recording timing setting means to determine an optimum recording condition, and thus data can be recorded with stable high quality.

At this time, the detected phase error amount is compared with a predetermined value, and when it is larger than the predetermined value, the shift amount of the recording timing is increased to increase the correction amount of the recording timing. Therefore, the deviated recording timing can be brought close to the desired recording timing by a single correction, and consequently, the time required for the optimum recording condition searching can be reduced.

Furthermore, when performing recording timing correction for each of the data patterns, highly-accurate correction can be performed. On the other hand, when performing correction using the sum of all the phase error amounts in the data patterns, the process of performing calculation for each data pattern can be dispensed with, and thus the time required for the optimum value searching can be reduced.

APPLICABILITY IN INDUSTRY

An optical disc device of the present invention can record data with an optimum recording condition according to a recording medium loaded on the optical disc device, and thereby the data can be recorded with stability and high quality.

The invention claimed is:

1. An optical disc device comprising:
an optical pickup which records data on a disc, or reproduces data recorded on the disc;
a data encoder which modulates data to be recorded to convert the data into a predetermined data format;
a recording timing setting means which sets a timing of recording the modulated data on the disc;
a phase error detection means which measures error amounts of marks and spaces constituting the data recorded on the disc from positions where the marks and spaces should be properly located;
an error convergence means which calculates error information indicating optimum positions of the marks, based on the error amounts detected by the phase error detection means;
a recording timing calculation means which calculates a correction value for the recording timing to be set on the recording timing setting means, based on the error information outputted from the error convergence means; and
a control means which feedbacks an output of the recording timing calculation means to the recording timing setting means under a predetermined convergence condition, thereby to optimize a recording condition.

2. An optical disc device comprising:
an optical pickup which records data on a disc, or reproduces data recorded on the disc;
a recording pattern generation means which generates an arbitrary recording pattern aimed at setting a recording condition;

a recording timing setting means which sets a timing of recording a signal outputted from the recording pattern generation means on the disc;

a phase error detection means which measures error amounts of marks and spaces constituting the data recorded on the disc from positions where the marks and spaces should be properly located;

an error convergence means which calculates error information indicating optimum positions of the marks, based on the error amounts detected by the phase error detection means;

a recording timing calculation means which calculates a correction value of a recording timing to be set on the recording timing setting means, based on the error information outputted from the error convergence means; and a control means which feedbacks an output of the recording timing calculation means to the recording timing setting means under a predetermined convergence condition, thereby to optimize the recording condition.

3. An optical disc device as defined in claim 1 further including:

a laser output control means which controls a laser output at the recording timing that is set by the recording timing setting means so that the recording positions of the marks on the disc are optimized.

4. An optical disc device as defined in claim 1 further including:

a phase error polarity detection means which measures the polarities of temporal deviations of a forward edge of a mark and a backward edge of the mark, respectively; and said error convergence means calculating the error information based on the error amounts with the polarities.

5. An optical disc device as defined in claim 1 further including:

an amplitude phase error detection means which measures phase information in an amplitude direction of a reproduction signal, said phase information corresponding to temporal deviations of a forward edge of a mark and a backward edge of the mark; and said error convergence means calculating the error information based on the phase information in the amplitude direction of the reproduced signal.

6. An optical disc device as defined in claim 4 further including:

an AD conversion means which converts an analog signal reproduced from the disc into a digital value; and said phase error detection means, said phase error polarity detection means, and said error convergence means performing the processes in digital modes.

7. An optical disc device as defined in claim 2 wherein:

said recording pattern generation means forms and outputs a recording pattern which enables efficient setting of a recording timing.

8. An optical disc device as defined in claim 1 wherein:

said phase error detection means detects a phase error for each combination of marks and spaces of a signal to be recorded on the disc; and said error convergence means calculates the error information for all combinations of marks and spaces which are detected by the phase error detection means.

9. An optical disc device as defined in claim 1 wherein:

said phase error detection means detects a phase error for each combination of marks and spaces of a signal to be recorded on the disc; and said error convergence means calculates the error information for a specific combination among all combinations of marks and spaces of the modulated signal to be recorded on the disc.

10. An optical disc device as defined in claim 4 wherein:

said error convergence means sets a parameter which controls a front end of the mark in the recording timing setting means, in a direction along which the mark formation timing should be delayed, when the phase error at the forward edge of the mark is positive, and sets a parameter which controls a rear end of the mark in the recording timing setting means, in a direction along which the mark formation timing should be advanced, when the phase error at the forward edge of the mark is negative.

11. An optical disc device as defined in claim 4 wherein:

said error convergence means sets a parameter which controls a rear end of the mark in the recording timing setting means, in a direction along which the mark formation timing should be delayed, when the phase error at the backward edge of the mark is positive, and sets a parameter which controls a front end of the mark in the recording timing setting means, in a direction along which the mark formation timing should be advanced, when the phase error at the backward edge of the mark is negative.

12. An optical disc device as defined in claim 1 wherein:

said error convergence means calculates the error information with the recording timing being largely shifted when the error amount detected by the phase error detection means is larger than an arbitrarily set condition, and calculates the error information with the recording timing being slightly shifted when the detected error amount is smaller than said arbitrarily set condition; and said control means adjusts the shift change amount of the recording timing by the error convergence means, according to the error amount detected by the phase error detection means.

13. An optical disc device as defined in claim 1 further including:

a code interval detection means which detects mark intervals from a reproduction signal read from the disc;

a code interval weighting means which weights the error amounts detected by the phase error detection means, according to the mark intervals detected by the code interval detection means; and said error convergence means calculating the error information based on the weighted error amounts.

14. An optical disc device as defined in claim 1 wherein:

when the error amounts obtained for all the combinations of marks and spaces which are detected by the phase error detection means are converged to 0 or within a prescribed range, said control means completes recording condition setting with a recording condition obtained at that time being an optimum recording condition.

15. An optical disc device as defined in claim 1 wherein:

when the sum of the error amounts obtained for all the combinations of marks and spaces which are detected by the phase error detection means is converged to 0 or within a prescribed range, said control means completes recording condition setting with a recording condition at that time being an optimum recording condition.

16. An optical disc device as defined in claim 14 wherein:

when the error amounts obtained for all the combinations of marks and spaces which are detected by the phase error detection means are not converged to 0 or within a prescribed range, said control means completes the recording condition setting with a recording condition which is obtained when the number of corrections for the recording timing by the recording timing setting means has reached a prescribed number of times, as an optimum recording condition.

17. An optical disc device as defined in claim 1 wherein:
said control means provides a reference for the error amounts of all the combinations of marks and spaces which are detected by the phase error detection means, and
when the error amounts of all the combinations of marks and spaces which are detected by the phase error detection means satisfy said reference, said control means completes recording condition setting with a recording condition at that time being an optimum recording condition.

18. An optical disc device as defined in claim 1 wherein:
said control means provides a reference for the error amounts of all the combinations of marks and spaces which are detected by the phase error detection means, and does not shift the recording conditions of the combinations of marks and spaces whose error amounts detected by the phase error detection means satisfy said reference, and
when the error amounts of all the combinations of marks and spaces are converged to said reference value or below and the sum of the phase errors at that time becomes equal to or lower than an arbitrary reference value, said control means completes recording condition setting with a recording condition at that time as an optimum recording condition.

19. An optical disc device as defined in claim 1 wherein:
said control means provides arbitrary reference values A, B and larger reference values n which satisfy the relation "A<B< . . . <n" for the error amounts of all the combinations of marks and spaces which are detected by the phase error detection means;
when the error amount obtained for a certain combination of marks and spaces satisfies reference that is set for the combination, said control means regards recording condition at that time as an optimum recording condition for the combination;
when the error amount obtained for a certain combination of marks and spaces exceeds said reference that is set for the combination, said control means regards, as an optimum recording condition for the combination, recording condition at the time when said obtained error amount satisfies a reference that is next largest to said reference and the sum of the error amounts of all the combinations is converged to a predetermined value or below; and
said control means does not shift the recording condition of the combination for which the optimum recording condition has been obtained, and completes recording condition setting when the optimum recording conditions for all the combinations of marks and spaces have finally been obtained.

20. A recording condition setting method comprising:
a recording data output step of outputting data to be recorded on an optical disc;
a recording timing setting step of setting a timing of recording the outputted recording data on the disc;
a data recording step of recording the recording data on the disc;
a phase error detection step of measuring error amounts of marks and spaces constituting the data recorded on the disc from positions where the marks and spaces should be properly located;
an error convergence step of calculating error information indicating optimum positions of the marks, based on the error amounts detected by the phase error detection means;
a recording timing calculation step of calculating a correction value of the recording timing that is set in the recording timing setting step, based on the error information outputted from the error convergence means; and
a control step of judging whether the recording timing is optimum or not based on the error amounts detected in the phase error detection step, and when the recording timing is not optimum, performing recording on the disc with the correction value calculated in the recording timing calculation step being reflected onto the recording timing that is set in the recording timing setting step, thereby to finally detect an optimum recording condition.

21. A recording condition setting method as defined in claim 20 wherein:
the data generated in the recording data output step has an arbitrary recording pattern aimed at setting a recording condition, and enables efficient setting of a recording timing.

22. A recording condition setting method as defined in claim 20 wherein:
said error convergence step calculates the error information with the recording timing being largely shifted when the error amounts detected in the phase error detection step are larger than an arbitrarily set condition, and calculates the error information with the recording timing being slightly shifted when the error amounts are smaller than said arbitrarily set condition; and
said control step adjusts the shift change amount of the recording timing in the error convergence step, according to the error amounts detected in the phase error detection step.

23. A recording condition setting method as defined in claim 20 further including:
a code interval detection step of detecting mark intervals from a reproduction signal read from the disc;
a code interval weighting step of weighting the error amounts detected in the phase error detection step, according to the mark intervals detected in the code interval detection means; and
said error convergence step calculating the error information based on the weighted error amounts.

24. An optical disc device as defined in claim 2 further including:
a laser output control means which controls a laser output at the recording timing that is set by the recording timing setting means so that the recording positions of the marks on the disc are optimized.

25. An optical disc device as defined in claim 2 further including:
a phase error polarity detection means which measures the polarities of temporal deviations of a forward edge of a mark and a backward edge of the mark, respectively; and
said error convergence means calculating the error information based on the error amounts with the polarities.

26. An optical disc device as defined in claim 2 further including:
an amplitude phase error detection means which measures phase information in an amplitude direction of a reproduction signal, said phase information corresponding to temporal deviations of a forward edge of a mark and a backward edge of the mark; and said error convergence means calculating the error information based on the phase information in the amplitude direction of the reproduced signal.

27. An optical disc device as defined in claim 5 further including:

an AD conversion means which converts an analog signal reproduced from the disc into a digital value; and said phase error detection means, said amplitude phase error polarity detection means, and said error convergence means performing the processes in digital modes.

28. An optical disc device as defined in claim 25 further including:

an AD conversion means which converts an analog signal reproduced from the disc into a digital value; and said phase error detection means, said phase error polarity detection means, and said error convergence means performing the processes in digital modes.

29. An optical disc device as defined in claim 26 further including:

an AD conversion means which converts an analog signal reproduced from the disc into a digital value; and said phase error detection means, said amplitude error polarity detection means, and said error convergence means performing the processes in digital modes.

30. An optical disc device as defined in claim 2 wherein:

said phase error detection means detects a phase error for each combination of marks and spaces of a signal to be recorded on the disc; and said error convergence means calculates the error information for all combinations of marks and spaces which are detected by the phase error detection means.

31. An optical disc device as defined in claim 2 wherein:

said phase error detection means detects a phase error for each combination of marks and spaces of a signal to be recorded on the disc; and said error convergence means calculates the error information for a specific combination among all combinations of marks and spaces of the modulated signal to be recorded on the disc.

32. An optical disc device as defined in claim 25 wherein:

said error convergence means sets a parameter which controls a front end of the mark in the recording timing setting means, in a direction along which the mark formation timing should be delayed, when the phase error at the forward edge of the mark is positive, and sets a parameter which controls a rear end of the mark in the recording timing setting means, in a direction along which the mark formation timing should be advanced, when the phase error at the forward edge of the mark is negative.

33. An optical disc device as defined in claim 25 wherein:

said error convergence means sets a parameter which controls a rear end of the mark in the recording timing setting means, in a direction along which the mark formation timing should be delayed, when the phase error at the backward edge of the mark is positive, and sets a parameter which controls a front end of the mark in the recording timing setting means, in a direction along which the mark formation timing should be advanced, when the phase error at the backward edge of the mark is negative.

34. An optical disc device as defined in claim 2 wherein:

said error convergence means calculates the error information with the recording timing being largely shifted when the error amount detected by the phase error detection means is larger than an arbitrarily set condition, and calculates the error information with the recording timing being slightly shifted when the detected error amount is smaller than said arbitrarily set condition; and said control means adjusts the shift change amount of the recording timing by the error convergence means, according to the error amount detected by the phase error detection means.

35. An optical disc device as defined in claim 2 wherein:

when the error amounts obtained for all the combinations of marks and spaces which are detected by the phase error detection means are converged to 0 or within a prescribed range, said control means completes recording condition setting with a recording condition obtained at that time being an optimum recording condition.

36. An optical disc device as defined in claim 2 wherein:

when the sum of the error amounts obtained for all the combinations of marks and spaces which are detected by the phase error detection means is converged to 0 or within a prescribed range, said control means completes recording condition setting with a recording condition at that time being an optimum recording condition.

37. An optical disc device as defined in claim 2 wherein:

said control means provides a reference for the error amounts of all the combinations of marks and spaces which are detected by the phase error detection means, and when the error amounts of all the combinations of marks and spaces which are detected by the phase error detection means satisfy said reference, said control means completes recording condition setting with a recording condition at that time being an optimum recording condition.

38. An optical disc device as defined in claim 2 wherein:

said control means provides a reference for the error amounts of all the combinations of marks and spaces which are detected by the phase error detection means, and does not shift the recording conditions of the combinations of marks and spaces whose error amounts detected by the phase error detection means satisfy said reference, and when the error amounts of all the combinations of marks and spaces are converged to said reference value or below and the sum of the phase errors at that time becomes equal to or lower than an arbitrary reference value, said control means completes recording condition setting with a recording condition at that time as an optimum recording condition.

39. An optical disc device as defined in claim 2 wherein:

said control means provides arbitrary reference values A, B and larger reference values n which satisfy the relation "A<B< ... <n" for the error amounts of all the combinations of marks and spaces which are detected by the phase error detection means;

when the error amount obtained for a certain combination of marks and spaces satisfies reference that is set for the combination, said control means regards recording condition at that time as an optimum recording condition for the combination;

when the error amount obtained for a certain combination of marks and spaces exceeds said reference that is set for the combination, said control means regards, as an optimum recording condition for the combination, recording condition at the time when said obtained error amount satisfies a reference that is next largest to said reference and the sum of the error amounts of all the combinations is converged to a predetermined value or below; and said control means does not shift the recording condition of the combination for which the optimum recording condition has been obtained, and completes recording condition setting when the optimum recording conditions for all the combinations of marks and spaces have finally been obtained.

* * * * *